United States Patent
Ikeda et al.

(10) Patent No.: US 12,416,837 B2
(45) Date of Patent: *Sep. 16, 2025

(54) LIQUID CRYSTAL DEVICE

(71) Applicant: JAPAN DISPLAY INC., Tokyo (JP)

(72) Inventors: Kojiro Ikeda, Tokyo (JP); Takeo Koito, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/765,740

(22) Filed: Jul. 8, 2024

(65) Prior Publication Data

US 2024/0361645 A1   Oct. 31, 2024

Related U.S. Application Data

(63) Continuation of application No. 18/242,645, filed on Sep. 6, 2023, now Pat. No. 12,044,939, which is a (Continued)

(30) Foreign Application Priority Data

Mar. 12, 2021   (JP) .................. 2021-040608

(51) Int. Cl.
   *G02F 1/1343*   (2006.01)
   *G02F 1/1347*   (2006.01)

(52) U.S. Cl.
   CPC ........ *G02F 1/13439* (2013.01); *G02F 1/1347* (2013.01)

(58) Field of Classification Search
   CPC ............... G02F 1/1347; G02F 1/13471; G02F 1/134363; G02F 1/134372; G02F 1/134381
   See application file for complete search history.

(56) References Cited

U.S. PATENT DOCUMENTS 6,781,657 B1 *  8/2004  Kim .................. G02F 1/134363
                                                    349/129
12,044,934 B2 *  7/2024  Ikeda ................ G02F 1/134309
(Continued)

FOREIGN PATENT DOCUMENTS

CN    103926748 A   7/2014
JP    H07-064081 A  3/1995
(Continued)

OTHER PUBLICATIONS

Search Report issued in related International Patent Application No. PCT/JP2022/008213 on May 10, 2022 and English translation of same. 7 pages.

(Continued)

*Primary Examiner* — Alexander P Gross
(74) *Attorney, Agent, or Firm* — K&L Gates LLP

(57) ABSTRACT

According to one embodiment, each of a first liquid crystal to a fourth liquid crystal cell includes a first strip electrode, a second strip electrode, a third strip electrode, and a fourth strip electrode, the first strip electrode to the fourth strip electrode of the first liquid crystal cell and the first strip electrode to the fourth strip electrode of the third liquid crystal cell have a first shape, and the first strip electrode to the fourth strip electrode of the second liquid crystal cell and the first strip electrode to the fourth strip electrode of the fourth liquid crystal cell have a second shape that is different from the first shape.

2 Claims, 16 Drawing Sheets

Related U.S. Application Data continuation of application No. PCT/JP2022/008213, filed on Feb. 28, 2022.

(56) References Cited

U.S. PATENT DOCUMENTS

| | | |
|---|---|---|
| 12,044,939 B2 * | 7/2024 | Ikeda .................... G02F 1/1347 |
| 2009/0147186 A1 | 6/2009 | Nakai et al. |
| 2016/0252782 A1 | 9/2016 | Wang et al. |
| 2018/0196318 A1 * | 7/2018 | Presniakov ....... G02F 1/134363 |
| 2019/0026657 A1 | 1/2019 | Presniakov et al. |
| 2019/0033669 A1 | 1/2019 | Presniakov et al. |
| 2020/0292894 A1 | 9/2020 | Liu et al. |
| 2022/0128869 A1 | 4/2022 | Tanaka |
| 2022/0187647 A1 | 6/2022 | Nagasawa |
| 2022/0260217 A1 | 8/2022 | Hasegawa |
| 2023/0418108 A1 | 12/2023 | Ikeda |
| 2024/0004243 A1 | 1/2024 | Koito |
| 2024/0045276 A1 | 2/2024 | Koito |
| 2024/0045282 A1 | 2/2024 | Ikeda |

FOREIGN PATENT DOCUMENTS

| | | |
|---|---|---|
| JP | 2010-230887 A | 10/2010 |
| JP | 2011-076107 A | 4/2011 |
| KR | 10-2009-0058368 A | 6/2009 |

OTHER PUBLICATIONS

Written Opinion issued in related International Patent Application No. PCT/JP2022/008213 on May 10, 2022. 4 pages.

Office Action issued in related Japanese Patent Application No. 2023-505302 mailed on Mar. 5, 2024 and English translation of same. 14 pages.

\* cited by examiner

LIQUID CRYSTAL DEVICE

CROSS-REFERENCE TO RELATED APPLICATIONS

This application is a Continuation Application of U.S. application Ser. No. 18/242,645, filed on Sep. 6, 2023, which is a Continuation Application of PCT Application No. PCT/JP2022/008213, filed Feb. 28, 2022 and based upon and claiming the benefit of priority from Japanese Patent Application No. 2021-040608 filed Mar. 12, 2021, the entire contents of all of which are incorporated herein by reference.

FIELD

Embodiments described herein relate generally to a liquid crystal device.

BACKGROUND

In recent years, light control devices that use liquid crystal cells have been proposed. Such light control devices refract light (p-polarized or s-polarized light) transmitted through the liquid crystal layer by controlling the alignment state of liquid crystal molecules or the refractive index distribution of the liquid crystal layer. For example, in a illumination device comprising a plurality of liquid crystal lenses, such a technology has been proposed to suppress non-uniformity by forming strip electrodes for forming respective liquid crystal lenses at positions that are displaced from each other.

DETAILED DESCRIPTION

Figure 1:
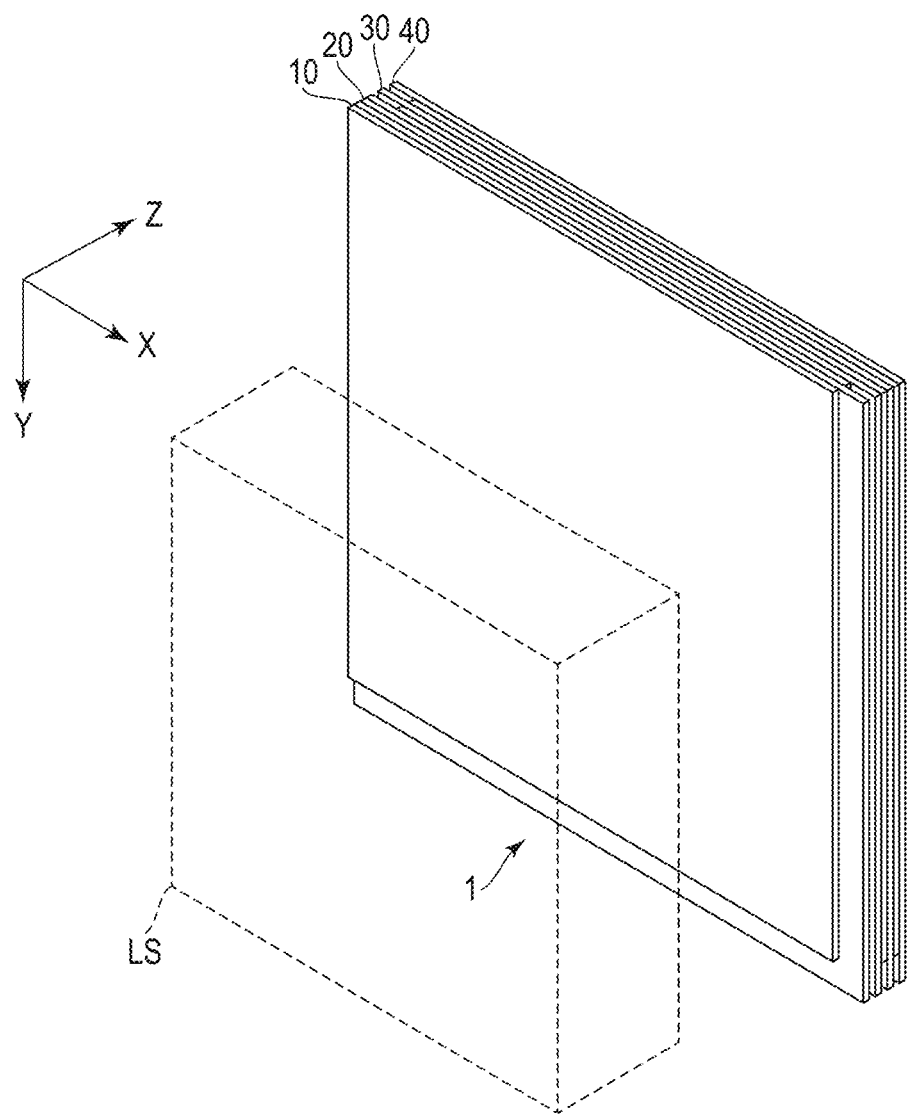
FIG. 1 is a perspective view showing a liquid crystal device according to an embodiment.

In general, according to one embodiment, a liquid crystal device comprises
a first liquid crystal cell;
a second liquid crystal cell which overlaps the first liquid crystal cell;
a third liquid crystal cell which overlaps the second liquid crystal cell; and
a fourth liquid crystal cell which overlaps the third liquid crystal cell,
each of the first liquid crystal cell to the fourth liquid crystal cell, comprises
a first transparent substrate;
a first alignment film;
a first strip electrode and a second strip electrode, located between the first transparent substrate and the first alignment film and arranged to be spaced apart from each other, to which different voltages are applied, respectively;
a second transparent substrate;
a second alignment film;
a third strip electrode and a fourth strip electrode, located between the second transparent substrate and the second alignment film and arranged to be spaced apart from each other, to which different voltages are applied, respectively; and
a liquid crystal layer located between the first alignment film and the second alignment film;
the first strip electrode, the second strip electrode, the third strip electrode and the fourth strip electrode of the first liquid crystal cell, and the first strip electrode, the second strip electrode, the third strip electrode and the fourth strip electrode of the third liquid crystal cell have a first shape, and
the first strip electrode, the second strip electrode, the third strip electrode and the fourth strip electrode of the second liquid crystal cell, and the first strip electrode, the second strip electrode, the third strip electrode and the fourth strip electrode of the fourth liquid crystal cell have a second shape different from the first shape.

According to another embodiment, a liquid crystal device comprises
a first liquid crystal cell;
a second liquid crystal cell which overlaps the first liquid crystal cell;
a third liquid crystal cell which overlaps the second liquid crystal cell; and
a fourth liquid crystal cell which overlaps the third liquid crystal cell,
each of the first liquid crystal cell to the fourth liquid crystal cell, comprises
a first transparent substrate;
a first alignment film;

a first strip electrode and a second strip electrode, located between the first transparent substrate and the first alignment film and arranged to be spaced apart from each other, to which different voltages are applied, respectively;

a second transparent substrate;

a second alignment film;

a third strip electrode and a fourth strip electrode, located between the second transparent substrate and the second alignment film and arranged to be spaced apart from each other, to which different voltages are applied, respectively; and a liquid crystal layer located between the first alignment film and the second alignment film, and the first liquid crystal cell to the fourth liquid crystal cell includes the first strip electrode, the second strip electrode, the third strip electrode and the fourth strip electrode, which have a zigzag shape.

According to still another embodiment, a liquid crystal device comprises a first liquid crystal cell;

a second liquid crystal cell which overlaps the first liquid crystal cell;

a third liquid crystal cell which overlaps the second liquid crystal cell; and a fourth liquid crystal cell which overlaps the third liquid crystal cell, each of the first liquid crystal cell to the fourth liquid crystal cell, comprises a first transparent substrate;

a first alignment film;

a first strip electrode and a second strip electrode, located between the first transparent substrate and the first alignment film and arranged to be spaced apart from each other, to which different voltages are applied, respectively;

a second transparent substrate;

a second alignment film;

a third strip electrode and a fourth strip electrode, located between the second transparent substrate and the second alignment film and arranged to be spaced apart from each other, to which different voltages are applied, respectively; and a liquid crystal layer located between the first alignment film and the second alignment film, and the first strip electrode of the first liquid crystal cell, the second strip electrode of the second liquid crystal cell, the first strip electrode of the third liquid crystal cell and the second strip electrode of the fourth liquid crystal cell have a first shape, and the second strip electrode of the first liquid crystal cell, the first strip electrode of the second liquid crystal cell, the second strip electrode of the third liquid crystal cell and the first strip electrode of the fourth liquid crystal cell have a second shape different from the first shape.

An object to be solved by the embodiments is to provide a liquid crystal device which can suppress moire.

Embodiments will be described hereinafter with reference to the accompanying drawings. Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

The embodiments described herein are not general ones, but rather embodiments that illustrate the same or corresponding special technical features of the invention. A liquid crystal device according to one embodiment will be described in detail with reference to the drawings as follows.

In this embodiment, a first direction X, a second direction Y and a third direction Z are orthogonal to each other, but may intersect at an angle other than 90°. The direction toward the tip of the arrow in the third direction Z is defined as up or above, and the direction opposite to the direction toward the tip of the arrow in the third direction Z is defined as down or below. The first direction X, second direction Y and third direction Z may as well be referred to as an X direction, a Y direction and a Z direction, respectively.

With such expressions as "the second member above the first member" and "the second member below the first member", the second member may be in contact with the first member or may be located away from the first member. In the latter case, a third member may be interposed between the first member and the second member. On the other hand, with such expressions as "the second member on the first member" and "the second member beneath the first member", the second member is in contact with the first member.

Further, it is assumed that there is an observation position to observe the electronic device on a tip side of the arrow in the third direction Z. Here, viewing from this observation position toward the X-Y plane defined by the first direction X and the second direction Y is referred to as plan view. Viewing a cross-section of the liquid crystal device in the X-Z plane defined by the first direction X and the third direction Z or in the Y-Z plane defined by the second direction Y and the third direction Z is referred to as cross-sectional view.

Embodiment

FIG. 1 is a perspective view showing a liquid crystal device 1 according to this embodiment.

The liquid crystal device 1 comprises a first liquid crystal cell 10, a second liquid crystal cell 20, a third liquid crystal cell 30, and a fourth liquid crystal cell 40. The liquid crystal device 1 according to this embodiment comprises two or more liquid crystal cells, and is not limited to the configuration comprising four liquid crystal cells as in the example shown in FIG. 1.

In the third direction Z, the first liquid crystal cell 10, the second liquid crystal cell 20, the third liquid crystal cell 30 and the fourth liquid crystal cell 40 overlap in this order as viewed from a light source side.

A light source LS, indicated by a dotted line, is disposed to oppose the first liquid crystal cell 10 in the third direction Z. It is preferable that the light source LS should be configured to emit collimated light, but a type that emits diffused light may as well be employed. The light emitted from the light source LS passes through the first liquid crystal cell 10, the second liquid crystal cell 20, the third liquid crystal cell 30 and the fourth liquid crystal cell 40 in order. As will be described later, the first liquid crystal cell 10, the second liquid crystal cell 20, the third liquid crystal cell 30 and the fourth liquid crystal cell 40 are configured to refract part of polarization components of the incident light.

Thus, by combining the liquid crystal device 1 and the light source LS, an illumination device which can diffuse and focus light can be provided.

Figure 2:
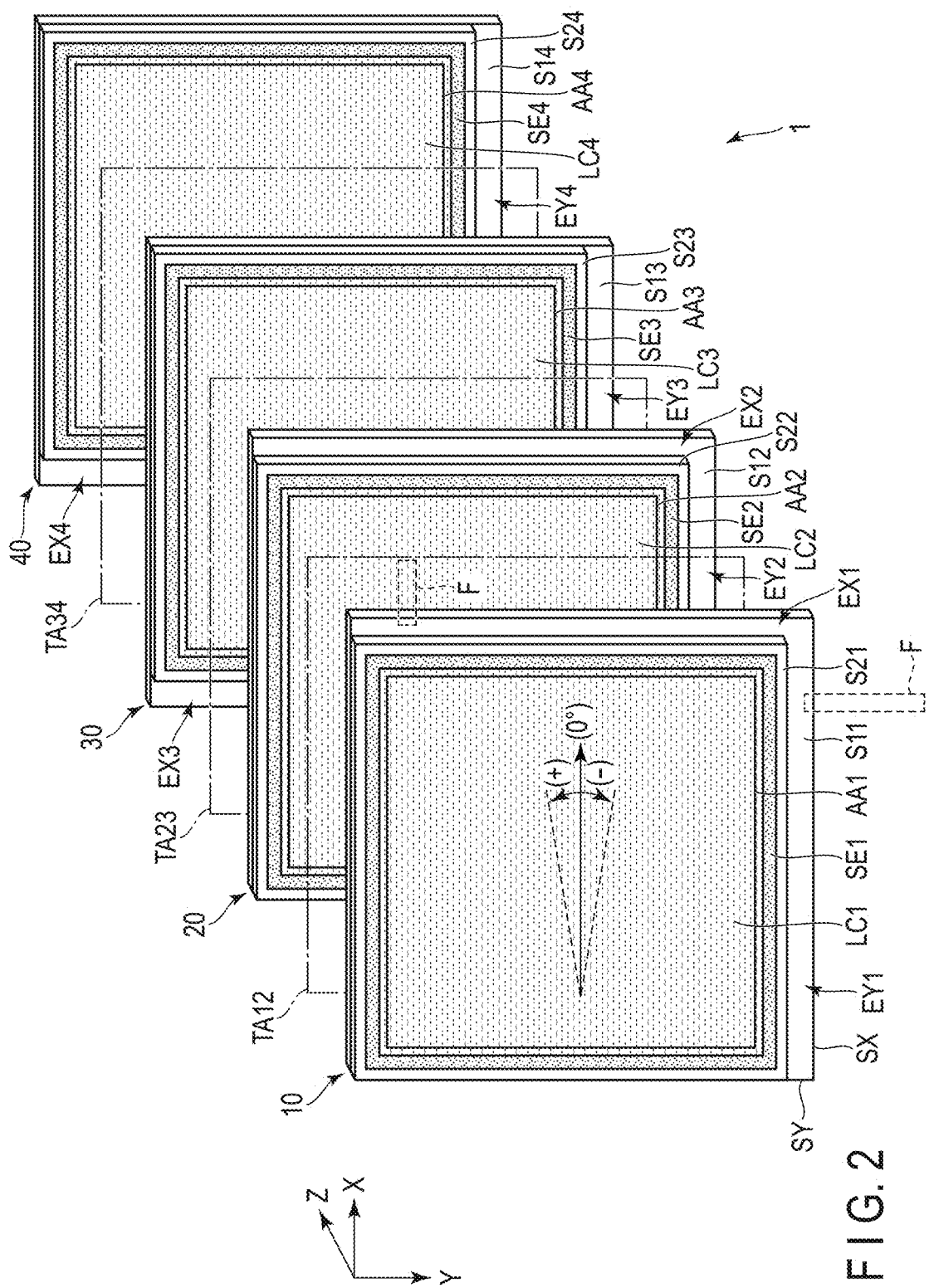
FIG. 2 is an exploded perspective view of the liquid crystal device shown in FIG. 1.

FIG. 2 is an exploded perspective view of the liquid crystal device 1 shown in FIG. 1.

A first liquid crystal cell 10 comprises a first transparent substrate S11, a second transparent substrate S21, a liquid crystal layer LC1 and a seal SE1. The first transparent substrate S11 and the second transparent substrate S21 are adhered to each other by the seal SE1. The liquid crystal layer LC1 is held between the first transparent substrate S11 and the second transparent substrate S21 and sealed by the seal SE1. An effective area AA1, which can refract incident light, is formed on an inner side of the area surrounded by the seal SE1.

In a plan view of the first crystal cell 10 discussed in this specification, with reference to one side SY located at a left end of the transparent substrate S11, the direction orthogonal to the side SY is the first direction X. The direction parallel to the side SY is the second direction Y. Further, with respect to the side SY, the direction of the tip of the arrow indicating 3 o'clock in the X-Y plane, that is, the first direction X, is set as 0°, and an angle counterclockwise to the first direction X is indicated by a positive (+) sign, and an angle clockwise to the first direction X is indicated by a negative (−) sign. The tip direction of the arrow indicating the second direction Y corresponds to a direction of 90° with respect to the first direction X.

Such relationships of correspondence between all directions can be similarly applied to other liquid crystal cells (the second liquid crystal cell 20, the third liquid crystal cell 30 and the fourth liquid crystal cell 40).

The first transparent substrate S11 includes an extending portion EX1 extending outward from the second transparent substrate S21 along the first direction X and an extending portion EY1 extending outward from the second transparent substrate S21 along the second direction Y. To at least one of the extending portion EX1 and the extending portion EY1, a flexible wiring board F as indicated by a dotted line is connected.

The second liquid crystal cell 20 comprises a first transparent substrate S12, a second transparent substrate S22, a liquid crystal layer LC2 and a seal SE2. An effective area AA2 is formed on an inner side of the area surrounded by the seal SE2.

The first transparent substrate S12 includes an extending portion EX2 and an extending portion EY2. In the third direction Z, the extending portion EX2 overlaps the extending portion EX1 and the extending portion EY2 overlaps the extending portion EY1. A flexible wiring board is connected to at least one of the extending portion EX2 and the extending portion EY2, but the illustration of the flexible wiring board is omitted in the other ones from the second liquid crystal cell 20 to the fourth liquid crystal cell 40.

The third liquid crystal cell 30 comprises a first transparent substrate S13, a second transparent substrate S23, a liquid crystal layer LC3 and a seal SE3. An effective area AA3 is formed on an inner side of the area f by the seal SE3.

The first transparent substrate S13 includes an extending portion EX3 and an extending portion EY3. In the third direction Z, the extending portion EY3 overlaps the extending portion EY2. The extending portion EX3 does not overlap the extending portion EX2 and is located on an opposite side to the extending portion EX2.

The fourth liquid crystal cell 40 comprises a first transparent substrate S14, a second transparent substrate S24, a liquid crystal layer LC4 and a seal SE4. An effective area AA4 is formed on an inner side of the area surrounded by the seal SE4.

The first transparent substrate S14 includes an extending portion EX4 and an extending portion EY4. In the third direction Z, the extending portion EX4 overlaps the extending portion EX3 and the extending portion EY4 overlaps the extending portion EY3.

Between the first liquid crystal cell 10 and the second liquid crystal cell 20, a transparent adhesive layer TA12 is disposed. The transparent adhesive layer TA12 adheres the first transparent substrate S11 and the second transparent substrate S22 to each other.

Between the second liquid crystal cell 20 and the third liquid crystal cell 30, a transparent adhesive layer TA23 is disposed. The transparent adhesive layer TA23 adheres the first transparent substrate S12 and the second transparent substrate S23 to each other.

Between the third liquid crystal cell 30 and the fourth liquid crystal cell 40, a transparent adhesive layer TA34 is disposed. The transparent adhesive layer TA34 adheres the first transparent substrate S13 and the second transparent substrate S24 to each other.

The first transparent substrates S11 to S14 are each formed into a square shape and have the same size. For example, in the first transparent substrate S11, a side SX and a side SY are orthogonal to each other, and the length of the side SX is the same as the length of the side SY.

Therefore, when the first liquid crystal cell 10, the second liquid crystal cell 20, the third liquid crystal cell 30 and the fourth liquid crystal cell 40 are adhered to each other, the sides along the first direction X overlap each other, as shown in FIG. 1, and the edges along the second direction Y overlap each other as well.

Note that the second substrate having a shape substantially the same as that of the area which transmits light (which is an effective area to be described later) may be formed into a square shape, and the first substrate may be formed into a polygonal shape other than a square shape, for example, a rectangular shape. Further, it is possible as well to adopt a configuration in which one of the extending portions of each liquid crystal cell is deleted.

Next, the configuration of the liquid crystal cells will now be described more specifically. Note that the following descriptions are directed to, as an example, the first liquid crystal cell 10 of a plurality of liquid crystal cells which constitutes the liquid crystal device 1, but the configuration of the other liquid crystal cells from the second liquid crystal cell 20 to the fourth liquid crystal cell 40 is substantially the same as that of the first liquid crystal cell 10 except for the direction in which the strip electrodes are extended.

Figure 3:
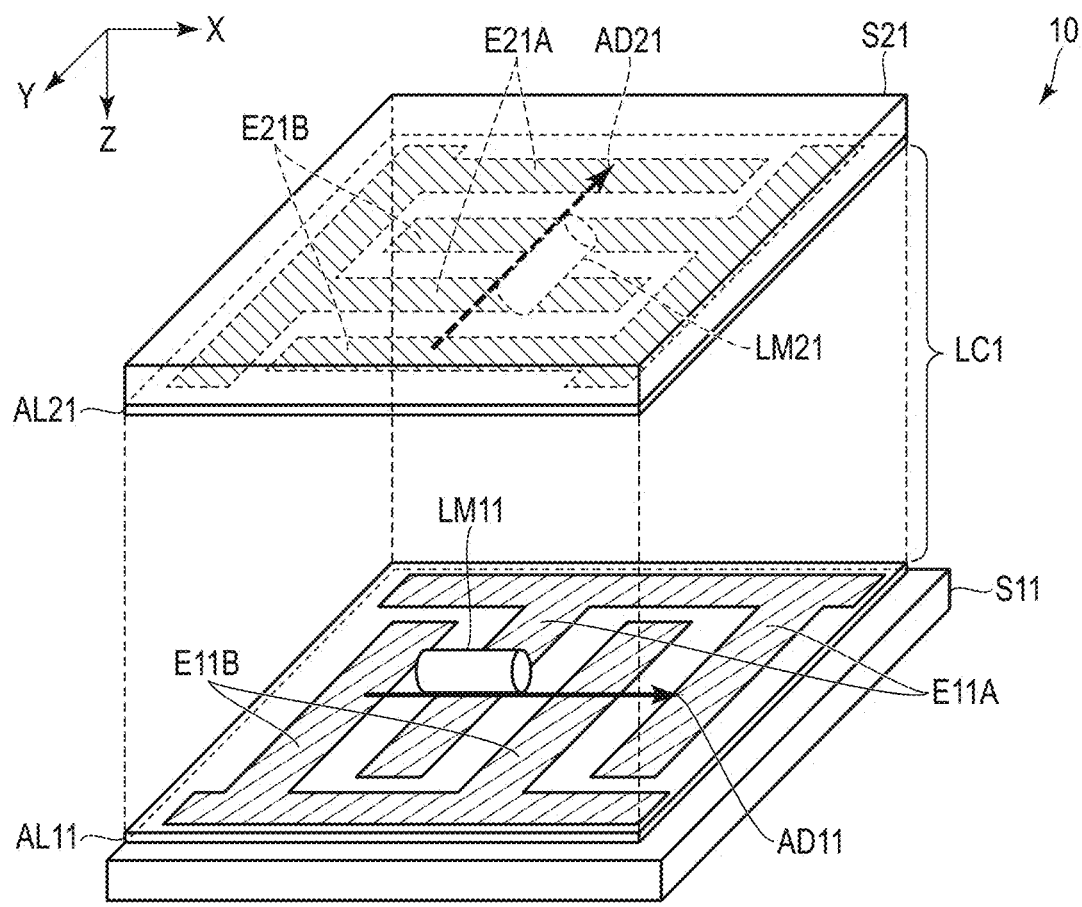
FIG. 3 is a view schematically showing a first liquid crystal cell shown in FIG. 2.

FIG. 3 is a perspective view schematically showing the first liquid crystal cell 10 shown in FIG. 2.

The first liquid crystal cell 10 comprises, in the effective area AA1, a first strip electrode E11A and a second strip electrode E11B, a first alignment film AL11, a third strip electrode E21A and a fourth strip electrode E21B, and a second alignment film AL21.

The first strip electrode E11A and the second strip electrode E11B are located between the first transparent substrate S11 and the first alignment film AL11, arranged to be spaced apart from each other and extend in the same direction. The first strip electrode E11A and the second strip electrode E11B may be in contact with the first transparent substrate S11 or an insulating film may be interposed between these and the first transparent substrate S11. Note that the insulating film may be interposed between the first strip electrode E11A and the second strip electrode E11B, and the first strip electrode E11A may be located in a layer different from that of the second strip electrode E11B.

The plurality of first strip electrodes E11A and the plurality of second strip electrodes E11B are aligned along the first direction X and disposed alternately. The plurality of first strip electrodes E11A are electrically connected to each other and configured so that the same voltage is applied thereto. The plurality of second strip electrodes E11B are electrically connected to each other and configured so that the same voltage is applied thereto. Note that the voltage applied to the second strip electrode E11B is controlled to be different from the voltage applied to the first strip electrode E11A.

The first alignment film AL11 covers the first strip electrode E11A and the second strip electrode E11B. An alignment treatment direction AD11 of the first alignment film AL11 is the first direction X. Note that the alignment treatment of each alignment film may be a rubbing treatment or a photo-alignment treatment. The alignment treatment direction may as well be referred to as a rubbing direction. Generally, when no voltage is being applied to the liquid crystal layer (an initial alignment state), liquid crystal molecules located near the alignment film are initially aligned in a predetermined direction by an alignment restriction force along the alignment treatment direction of the alignment film. That is, in the example shown here, the initial alignment direction of liquid crystal molecules LM11 along the first alignment film AL11 is the first direction X. The alignment treatment direction AD11 intersects the first strip electrode E11A and the second strip electrode E11B.

The third strip electrode E21A and the fourth strip electrode E21B are located between the second transparent substrate S21 and the second alignment film AL21, arranged to be spaced apart from each other and extend in the same direction. The third strip electrode E21A and the fourth strip electrode E21B may be in contact with the second transparent substrate S21 or an insulating film may be interposed between these and the second transparent substrate S21. Further, the insulating film may be interposed between the third strip electrode E21A and the fourth strip electrode E21B, and the third strip electrode E21A may be located in a layer different from that of the fourth strip electrode E21B.

The plurality of third strip electrodes E21A and the plurality of fourth strip electrodes E21B are aligned in the second direction Y and disposed alternately. The plurality of third strip electrodes E21A are electrically connected to each other and configured so that the same voltage is applied thereto. The plurality of fourth strip electrodes E21B are electrically connected to each other and configured so that the same voltage is applied thereto. Note that the voltage applied to the fourth strip electrode E21B is controlled to be different from the voltage applied to the third strip electrode E21A. Further, the direction in which the first strip electrode E11A and the second strip electrode E11B are extended is orthogonal to the direction in which the third strip electrode E21A and the fourth strip electrode E21B are extended, as will be described in detail later.

The second alignment film AL21 covers the third strip electrode E21A and the fourth strip electrode E21B. The alignment treatment direction AD21 of the second alignment film AL21 is the second direction Y. That is, in the example shown here, the initial alignment direction of liquid crystal molecules LM21 along the second alignment film AL21 is the second direction Y. The alignment treatment direction AD11 of the first alignment film AL11 and the alignment treatment direction AD21 of the second alignment film AL21 are orthogonal to each other. The alignment treatment direction AD21 intersects the third strip electrode E21A and the fourth strip electrode E21B.

Some examples will now be described. In each of these examples, the alignment treatment direction in each of the first liquid crystal cell 10, the second liquid crystal cell 20, the third liquid crystal cell 30 and the fourth liquid crystal cell 40, the extending direction of the first electrode and the second strip electrode, and the extending direction of the third electrode and the fourth strip electrode will be described.

Example 1

Figure 4:
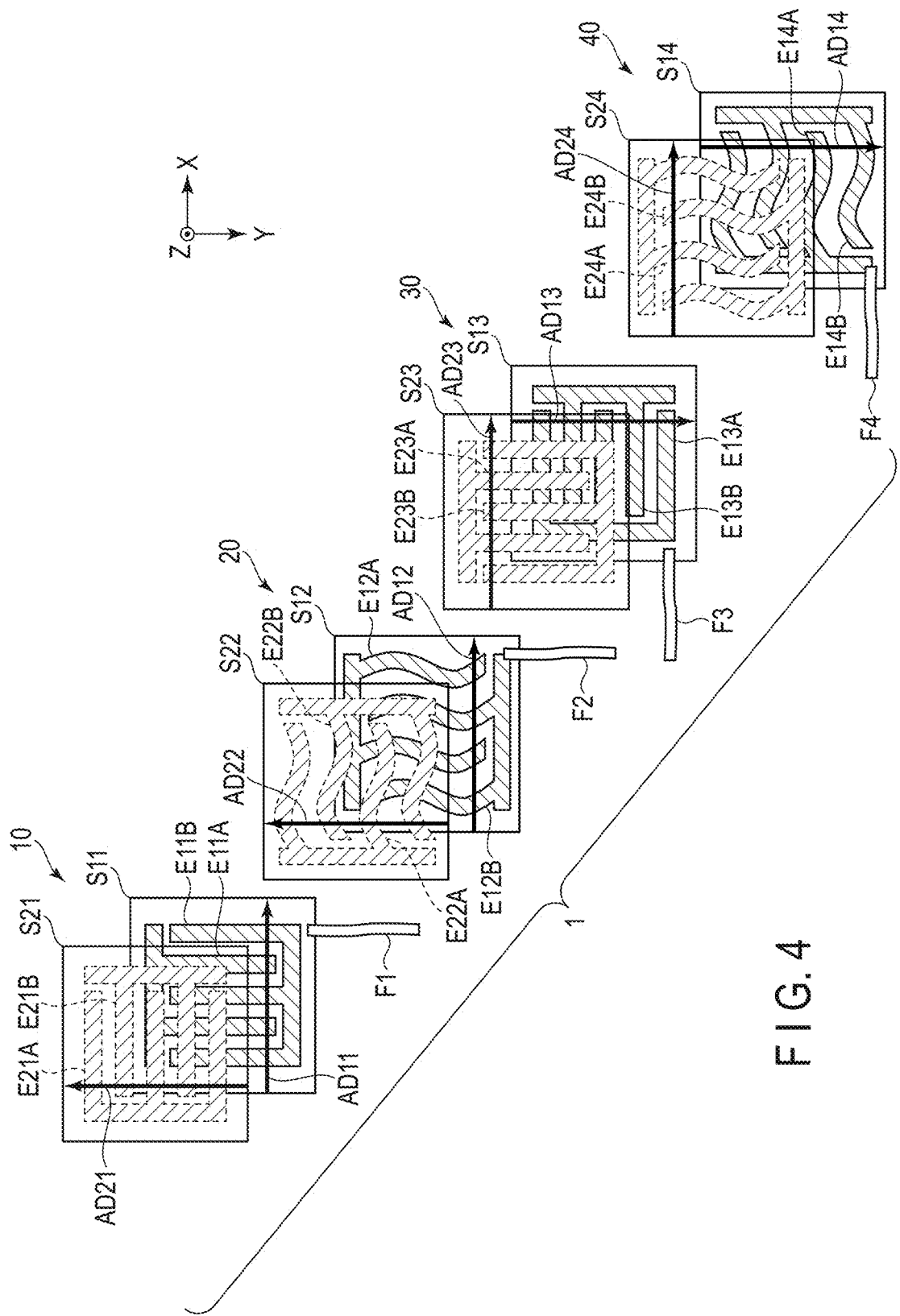
FIG. 4 is a diagram showing an example of an extending direction of each strip electrode which constitutes the liquid crystal device.

FIG. 4 is a diagram showing an example of the extending direction of each strip electrode which constitutes the liquid crystal device 1.

In the first liquid crystal cell 10, the alignment treatment direction AD11 is a direction of 0° with respect to the first direction X. The extending direction of the first strip electrode E11A and the second strip electrode E11B is a direction of 90° with respect to the first direction X.

The first strip electrode E11A and the second strip electrode E11B are electrodes having a linear shape and include linearly extending edges, respectively. In this embodiment, the extending direction of the first strip electrode E11A and the second strip electrode E11B is an angle made between the first direction X, which is the common reference direction, and the edge of the strip electrode.

The alignment treatment direction AD21 is a direction of 90° with respect to the first direction X. The extending direction of the third strip electrode E21A and the fourth strip electrode E21B is a direction of 0° with respect to the first direction X.

The third strip electrode E21A and the fourth strip electrode E21B are electrodes having a linear shape and include linearly extending edges, respectively. In this embodiment, the extending direction of the third strip electrode E21A and the fourth strip electrode E21B is an angle made between the second direction Y, which is the common reference direction, and the edge of the strip electrode.

The extending direction of the first strip electrode E11A and the second strip electrode E11B is orthogonal to the extending direction of the third strip electrode E21A and the fourth strip electrode E21B.

In the second liquid crystal cell 20, the alignment treatment direction AD12 is a direction of 0° with respect to the first direction X. The extending direction of the first strip electrode E12A and the second strip electrode E12B is a direction of 90° with respect to the first direction X.

The alignment treatment direction AD22 is a direction of 90°. The extending direction of the third strip electrode E22A and the fourth strip electrode E22B is a direction of 0° with respect to the first direction X.

The extending direction of the first strip electrode E12A and the second strip electrode E12B is orthogonal to the extending direction of the third strip electrode E22A and the fourth strip electrode E22B.

Figure 5A:
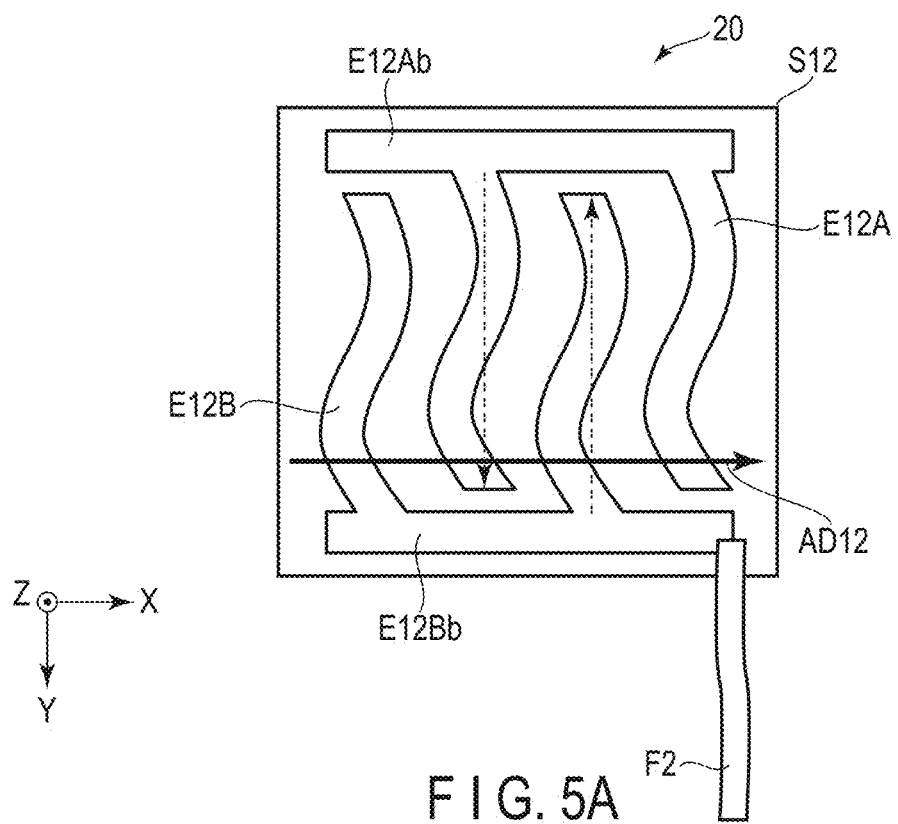
FIG. 5A is a plan view of a second liquid crystal cell.
Figure 5B:
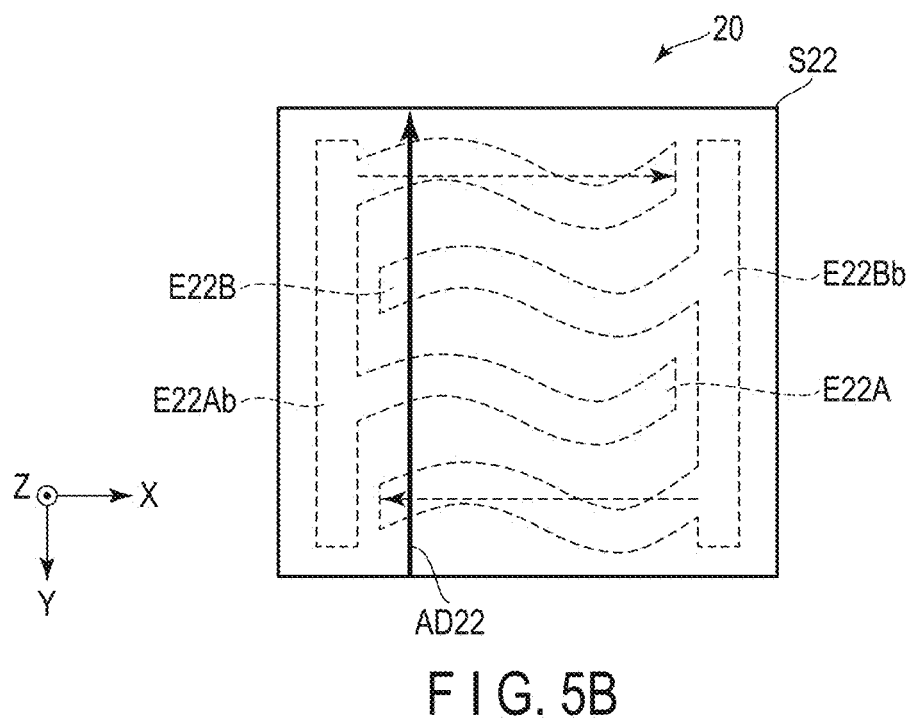
FIG. 5B is a plan view of the second liquid crystal cell.

FIGS. 5A and 5B are plan views of the second liquid crystal cell 20. The first strip electrode E12A and the second strip electrode E12B are electrodes having a wavy shape. An electrode having a wavy shape is a curved electrode that meanders. An electrode having a wavy shape can as well referred to as an electrode having an electrode edge continuous while varying its curvature. When the electrode having the wavy shape is closer to a sinusoidal wave, the extending direction of the electrode with the wavy shape is the extending direction of a straight line connecting the starting points of the cycles. Alternatively, it can be said that the proceeding direction of the wave of the wavy shape is the extending direction of the electrode of the wavy shape. In FIG. 5A, the broken-line arrow indicates the extending direction of the electrode of the wavy shape. Note here that the wavy shape may not be a sinusoidal wave or the like, but it suffices if it is formed repeatedly while varying its curvature.

As shown in FIG. 5A, the wavy shaped strip electrode extends from a rectangular electrode. For example, the first strip electrode E12A extends along the second direction Y from a rectangular electrode E12Ab that extends in a direction parallel to the first direction X. The second strip electrode E12B extends along a direction opposite to the second direction Y from a rectangular electrode E12Bb extending in a direction parallel to the first direction X.

As shown in FIG. 5B, for example, the third strip electrode E22A extends along the first direction X from a rectangular electrode E22Ab extending in a direction parallel to the second direction Y. The fourth strip electrode E22B extends along a direction opposite to the first direction X from a rectangular electrode E22Bb extending in a direction parallel to the second direction Y.

In this example, the second direction Y and the opposite direction thereto are referred to as the direction parallel to the second direction Y. This is also the case for the first direction X and other directions specifically described below.

Back to FIG. 4, in the third liquid crystal cell 30, the alignment treatment direction AD13 is a direction of −90°. The extending direction of the first strip electrode E13A and the second strip electrode E13B, which have a linear shape is a direction of 0°.

The alignment treatment direction AD23 is a direction of 0°. The extending direction of the third strip electrode E23A and the fourth strip electrode E23B, which have a linear shape is a direction of 90°.

The extending direction of the first strip electrode E13A and the second strip electrode E13B is orthogonal to the extending direction of the third strip electrode E23A and the fourth strip electrode E23B.

In the fourth liquid crystal cell 40, the alignment treatment direction AD14 is a direction of −90°. The extending direction of the first strip electrode E14A and the second strip electrode E14B, which have a wavy shape is a direction of 0°.

The alignment treatment direction AD24 is a direction of 0°. The extending direction of the third strip electrode E24A and the fourth strip electrode E24B, which have a wavy shape is a direction of 90°.

The extending direction of the first strip electrode E14A and the second strip electrode E14B is orthogonal to the extending direction of the third strip electrode E24A and the fourth strip electrode E24B.

The flexible wiring board F1 connected to the first transparent substrate S11 and the flexible wiring board F2 connected to the first transparent substrate S12 are drawn approximately along the second direction Y. The flexible wiring board F3 connected to the first transparent substrate S13 and the flexible wiring board F4 connected to the first transparent substrate S14 are drawn approximately in a direction parallel to the first direction X. The flexible wiring boards F1 to F4 may as well be drawn in different directions from those above.

Here, the mutual relationship of the liquid crystal cells will be described.

Let us focus on the first liquid crystal cell 10 and the second liquid crystal cell 20. The electrode shape of the first strip electrode E11A and the second strip electrode E11B, and the shape of the first strip electrode E12A and the second strip electrode E12B are different from each other as linear and wavy shapes, respectively.

When the first liquid crystal cell 10 and the second liquid crystal cell 20 are adhered together, for example, the extending directions thereof are both a direction of 90°. However, the electrode shapes thereof are different from each other as the linear and wavy shapes, and therefore the electrode edges of the first strip electrode E11A and the first strip electrode E12A do not match. Thus, there are no electrodes that completely overlap each other, and therefore moire can be suppressed. Note that for the other electrodes, specifically, for each pair of the second strip electrode E11B and the second strip electrode E12B, the third strip electrode E21A and the third strip electrode E22A, and the fourth strip electrode E21B and the fourth strip electrode E22B, the extending directions of each pair are the same as each other, but the edges of these electrodes do not match in plan view because the shapes thereof are different from each other.

Here, the mutual relationship between the first liquid crystal cell 10 and the second liquid crystal cell 20 have been described here. These descriptions can as well be applied to the mutual relationship between the third liquid crystal cell 30 and the fourth liquid crystal cell 40.

Next, let us focus on the first liquid crystal cell 10 and the third liquid crystal cell 30. The extending direction of the first strip electrode E11A and the second strip electrode E11B, which have a linearly shape and the first strip electrode E13A and the second strip electrode E13B, which have a linearly shape are orthogonal to each other.

Further, the extending direction of the third strip electrode E21A and the fourth strip electrode E21B, which have a linear shape and the third strip electrode E23A and the fourth strip electrode E23B, which have a linear shape are orthogonal to each other.

When the first liquid crystal cell 10 is rotated by 90° clockwise in the X-Y plane, the extending direction of the first strip electrode E11A and the second strip electrode E11B matches the extending direction of the first strip electrode E13A and the second strip electrode E13B. Similarly, the extending direction of the third strip electrode E21A and the fourth strip electrode E21B matches the extending direction of the third strip electrode E23A and the fourth strip electrode E23B.

In other words, in the X-Y plane, a pair of the first strip electrode E11A and the second strip electrode E11B, and a pair of the first strip electrode E13A and the second strip electrode E13B are rotationally symmetrical by 90° with respect to each other. Similarly, a pair of the third strip electrode E21A and the fourth strip electrode E21B, and a pair of the third strip electrode E23A and the fourth strip electrode E23B are rotationally symmetrical by 90° with respect to each other. In other words, the first liquid crystal cell 10 and the third liquid crystal cell 30 are rotationally symmetrical by 90° with respect to each other, and the first liquid crystal cell 10 can be used as the third liquid crystal cell 30 by rotating it 90° clockwise in the X-Y plane. Therefore, as compared to the case where the first liquid crystal cell 10 and the third liquid crystal cell 30 are prepared separately, the cost can be reduced.

Further, even when the first liquid crystal cell 10, the second liquid crystal cell 20 and the third liquid crystal cell 30 are adhered to each other, there are no electrodes that completely overlap each other when viewed between the first transparent substrates of each liquid crystal cell or between the second transparent substrates, and thus moire can be suppressed.

Here, the mutual relationship between the first liquid crystal cell 10 and the third liquid crystal cell 30 has been described, but this is also the case for the mutual relationship between the second liquid crystal cell 20 and the fourth liquid crystal cell 40. That is, the second liquid crystal cell 20 and the fourth liquid crystal cell 40 are rotationally symmetrical by 90° with respect to each other, and by rotating the second liquid crystal cell 20 by 90° clockwise in the X-Y plane, it can be used as the fourth liquid crystal cell 40. Therefore, the cost can be reduced as compared to the case where the second liquid crystal cell 20 and the fourth liquid crystal cell 40 are prepared separately. As described above, by preparing two types of liquid crystal cells having different extending directions of the strip electrodes, it is possible to configure a liquid crystal device 1 in which the first liquid crystal cell 10 to the fourth liquid crystal cell 40 described above are stacked one on another.

Now, let us focus on the first liquid crystal cell 10 and the fourth liquid crystal cell 40. The shape of the third strip electrode E21A and the fourth strip electrode E21B on the second transparent substrate S21 of the first liquid crystal cell 10 and the shape of the first strip electrode E14A and the second strip electrode E14B on the first transparent substrate S14 of the fourth liquid crystal cell 40 are different from each other as a linear shape and a wavy shape, respectively, but both extend in the first direction X. The shape of the first strip electrode E11A and the second strip electrode E11B on the first transparent substrate S11 of the first liquid crystal cell 10 and the shape of the third strip electrode E24A and the fourth strip electrode E24B on the second transparent substrate S24 of the fourth liquid crystal cell 40 are different from each other as a linear shape and a wavy shape, respectively, but both extend in the second direction Y.

When the first liquid crystal cell 10 and the fourth liquid crystal cell 40 are stacked one on another, for example, the extending directions of the third strip electrode E21A and the first strip electrode E14A are the same as each other (the first direction X), but the shapes of the electrodes are different from each other as the linear and wavy shapes, and therefore the edges thereof do not match. Here, there are no electrodes that completely overlap each other, and therefore moire can be suppressed. Further, note that both the electrodes act on the same polarization component (for example, p-polarization component). Here, with the electrodes having different shapes as described above, the manner of diffusion can be changed slightly, thus also making it possible to suppress moire. Note that the other electrodes, namely, a pair of the fourth strip electrode E21B and the second strip electrode E14B, a pair of the first strip electrode E11A and the third strip electrode E24A, and a pair of the second strip electrode E11B and the fourth strip electrode E24B as well have the same extending direction, but their electrode shapes are different from each other, and therefore the edges of the electrodes do not match in plan view.

Similarly, let us focus on the second liquid crystal cell 20 and the third liquid crystal cell 30. The shape of a pair of the third strip electrode E22A and the fourth strip electrode E22B on the second transparent substrate S22 of the second liquid crystal cell 20 and the shape of a pair of the first strip electrode E13A and the second strip electrode E13B on the first transparent substrate S13 of the third liquid crystal cell 30 are different from each other as a linear shape and a wavy shape, respectively, but they all extend in the first direction X. Further, the shape of a pair of the first strip electrode E12A and the second strip electrode E12B on the first transparent substrate S12 of the second liquid crystal cell 20 and the shape of a pair of the third strip electrode E23A and the fourth strip electrode E23B on the second transparent substrate S23 of the third liquid crystal cell 30 are different from each other as a linear shape and a wavy shape, respectively, but both extend in the second direction Y.

When the second liquid crystal cell 20 and the third liquid crystal cell 30 are stacked one on another, for example, the extending directions of the third strip electrode E22A and the first strip electrode E13A are the same as each other (the first direction X), but the shapes of the electrodes are different from each other as linear and wavy shapes, respectively, and therefore the edges of the electrodes do not match each other. Thus, there are no electrodes that completely overlap each other, and therefore moire can be suppressed. Further, note that both the electrodes act on the same polarization component (for example, p-polarization component). Here, with the electrodes having different shapes as described above, the manner of diffusion can be changed slightly, thus also making it possible to suppress moire. Note that the other electrodes, namely, a pair of the fourth strip electrode E22B and the second strip electrode E13B, a pair of the first strip electrode E12A and the third strip electrode E23A, and a pair of the second strip electrode E12B and the fourth strip electrode E23B as well have the same extending direction, but their electrode shapes are different from each other, and therefore the edges of the electrodes do not match in plan view.

In addition, even when the first liquid crystal cell 10, the second liquid crystal cell 20, the third liquid crystal cell 30 and the fourth liquid crystal cell 40 are adhered to each other, there are no electrodes that completely overlap each other when viewed between the first transparent substrates of each liquid crystal cell or between the second transparent substrates, and therefore moire can be suppressed.

Now, the optical action in the first liquid crystal cell 10 will now be described with reference to FIGS. 6 and 7. Note that FIGS. 6 and 7 illustrate only the configurations necessary for explanation of the liquid crystal molecules LM1 in the vicinity of the transparent substrate S11, and the like.

Figure 6:
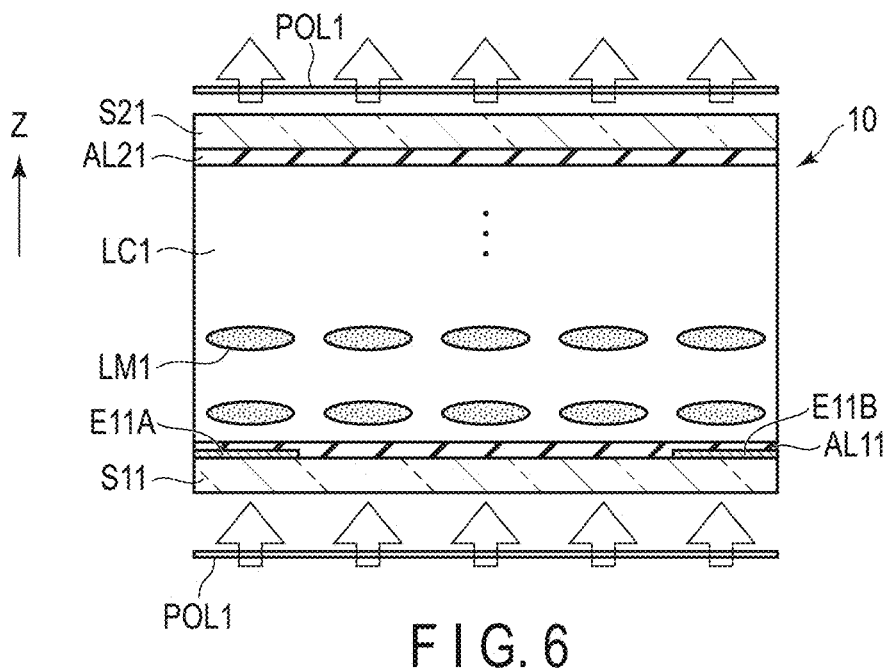
FIG. 6 is a diagram schematically showing the first liquid crystal cell in an off state in which no electric field is formed in a liquid crystal layer.

FIG. 6 is a diagram schematically showing the first liquid crystal cell 10 in an off state (OFF) where no electric field is formed in the liquid crystal layer LC1.

In the liquid crystal layer LC1 in the off state, the liquid crystal molecules LM1 are initially aligned. In such an off state, the liquid crystal layer LC1 has substantially a uniform refractive index distribution. Therefore, the polarization component POL1, which is the light incident on the first liquid crystal cell 10, passes through the liquid crystal layer LC1 without being substantially refracted (or diffused). Note that as shown in FIG. 3, in the first liquid crystal cell 10, between the upper and lower transparent substrates S11 and S21, the initial alignment directions of the liquid crystal molecules in the liquid crystal layers LC1 intersect each other at 90°. With this configuration, the liquid crystal molecules of the liquid crystal layer LC1 are aligned in the first direction X on the first transparent substrate S11 side, but they gradually change their alignment direction from the first direction X to the second direction Y as the location is closer toward the second transparent substrate S21 side, and are aligned in the second direction Y on the second transparent substrate S21 side. The direction of the polarization component changes in accordance with such a change in the alignment of the liquid crystal layer LC1. More specifically, a polarization component having a polarization axis in the first direction X changes its polarization axis to the second direction Y in the process of passing through the liquid crystal layer LC1. On the other hand, a polarization component having a polarization axis in the second direction Y changes its polarization axis from the second direction Y to the first direction X as it passes through the liquid crystal layer LC1. Therefore, when viewed in terms of these polarization components mutually orthogonal to each other, their polarization axes are switched in the process of passing through the first liquid crystal cell 10. Hereinafter, this effect of changing the direction of the polarization axis may be referred to as optical rotation.

Figure 7:
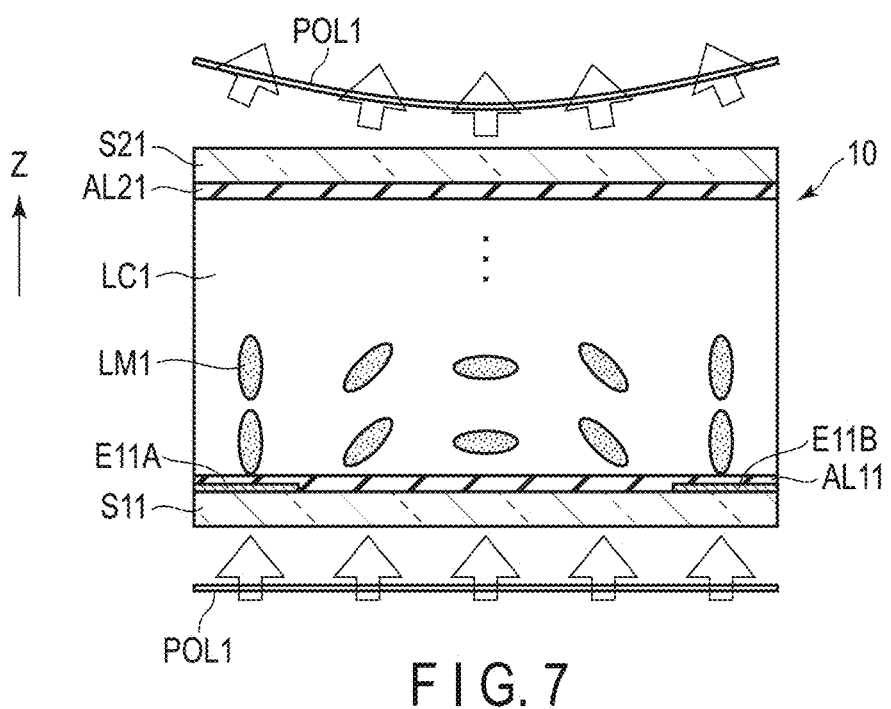
FIG. 7 is a diagram schematically showing the first liquid crystal cell in an on state in which an electric field is formed in the liquid crystal layer.

FIG. 7 is a diagram schematically showing the first liquid crystal cell 10 in an on state (ON) where an electric field is formed in the liquid crystal layer LC1.

In the ON state, a potential difference is created between the first strip electrode E11A and the second strip electrode E11B, and thus an electric field is formed in the liquid crystal layer LC1. For example, when the liquid crystal layer LC1 has positive dielectric anisotropy, the liquid crystal molecules LM1 are aligned so that their long axes are along the electric field. But note here that the range of the electric field between the first strip electrode E11A and the second strip electrode E11B is about ½ of the thickness of, mainly, the liquid crystal layer LC1. Therefore, as shown in FIG. 7, in the range of the liquid crystal layer LC1, which is close to the first transparent substrate S11, a region in which the liquid crystal molecules LM1 are aligned substantially perpendicular to the substrate, a region in which the liquid crystal molecules LM1 are aligned diagonally with respect to the substrate, a region in which the liquid crystal molecules LM1 are aligned substantially horizontal to the substrate, and the like are formed.

The liquid crystal molecules LM1 have a refractive anisotropy Δn. Therefore, the liquid crystal layer LC1 in the ON state has a refractive index distribution or retardation distribution according to the alignment state of liquid crystal molecules LM1. The term "retardation" here can be expressed as $\Delta n \cdot d$ when the thickness of the liquid crystal layer LC1 is represented by d. Note that in this example, a positive type liquid crystal is used as the liquid crystal layer LC1, but a negative type liquid crystal can as well be used in consideration of the alignment direction and the like.

In such an ON state, the polarization component POL1 is diffused under the influence of the refractive index distribution of the liquid crystal layer LC1 as it passes through the liquid crystal layer LC1. More specifically, the polarization component having a polarization axis in the first direction X is diffused under the influence of the refractive index distribution of the liquid crystal layer LC1 and is rotated in the second direction Y. On the other hand, the polarization component having a polarization axis in the second direction Y is not affected by the refractive index distribution and passes through the liquid crystal layer LC1 without being diffused but rotating only in the first direction X. Note that FIG. 6 illustrates the case where an electric field is formed by the potential difference between the first strip electrode E11A and the second strip electrode E11B, but note that when diffusing the incident light in the first liquid crystal cell 10, it is desirable to also form an electric field by the potential difference between the third strip electrode E21A and the fourth strip electrode E21B. With this configuration, the alignment states of not only the liquid crystal molecules in the vicinity of the first transparent substrate S11 but also the molecules in the vicinity of the second transparent substrate S21 are controlled, thereby making it possible to form a predetermined refractive index distribution in the liquid crystal layer LC1. More specifically, when the liquid crystal layer LC1 on the second transparent substrate S21 side also has a refractive index distribution, the polarization component that are rotated in the second direction Y in the process of passing through the liquid crystal layer LC1 is diffused. That is, the polarization component diffused on the transparent substrate S11 side is further diffused on the transparent substrate S21 side and emitted from the first liquid crystal cell 10. On the other hand, the polarization component rotated in the first direction X in the process of passing through the liquid crystal layer LC1 is emitted from the first liquid crystal cell LC1 without being affected by the refractive index distribution.

Note that such diffusion of polarization component and optical rotation occur in the second liquid crystal cell LC20 as well. That is, a polarization component emitted from a light source and having a polarization axis in the first direction X changes its polarization axis from the first direction X to the second direction Y by passing through the first liquid crystal cell 10, and further changes its polarization axis from the second direction Y to the first direction X by passing through the second liquid crystal cell 20. Further, when the liquid crystal molecules parallel to the polarization component have a refractive index distribution in this process, the polarization component is diffused according to the refractive index distribution. Similarly, a polarization component emitted from the light source and having a polarization axis in the second direction Y changes its polarization axis from the second direction Y to the first direction X by passing through the first liquid crystal cell 10, and further changes its polarization axis from the first direction X to the second direction Y by passing through the second liquid crystal cell 20. Further, when the liquid crystal molecules parallel to the polarization component have a refractive index distribution in this process, the polarization component is diffused according to the refractive index distribution. The same phenomenon occurs in the third liquid crystal cell 30 and the fourth liquid crystal cell 40, which are those obtained by rotating the first liquid crystal cell and the second liquid crystal cell by 90°, and therefore the polarization components affected by the diffusion effect are switched over.

That is, in a configuration in which the first liquid crystal cell 10, the second liquid crystal cell 20, the third liquid crystal cell 30 and the fourth liquid crystal cell 40 are stacked one on another, for example, the first liquid crystal cell 10 and the fourth liquid crystal cell 40 are configured to scatter (diffuse), mainly, the polarization component POL1, which is p-polarized light, whereas the second liquid crystal cell 20 and the third liquid crystal are configured to scatter (diffuse), mainly, the polarization component POL2, which is s-polarized light.

As described above, each of the first liquid crystal cell 10, the second liquid crystal cell 20, the third liquid crystal cell 30 and the fourth liquid crystal cell 40 is configured not to include electrodes extending in the same direction. With this configuration, the liquid crystal layers of the liquid crystal cells form refractive index distributions different from each other in the ON state. Thus, the interference effect of light transmitted through each liquid crystal cell is reduced, thereby making it possible to suppress moire.

Example 2

Figure 8:
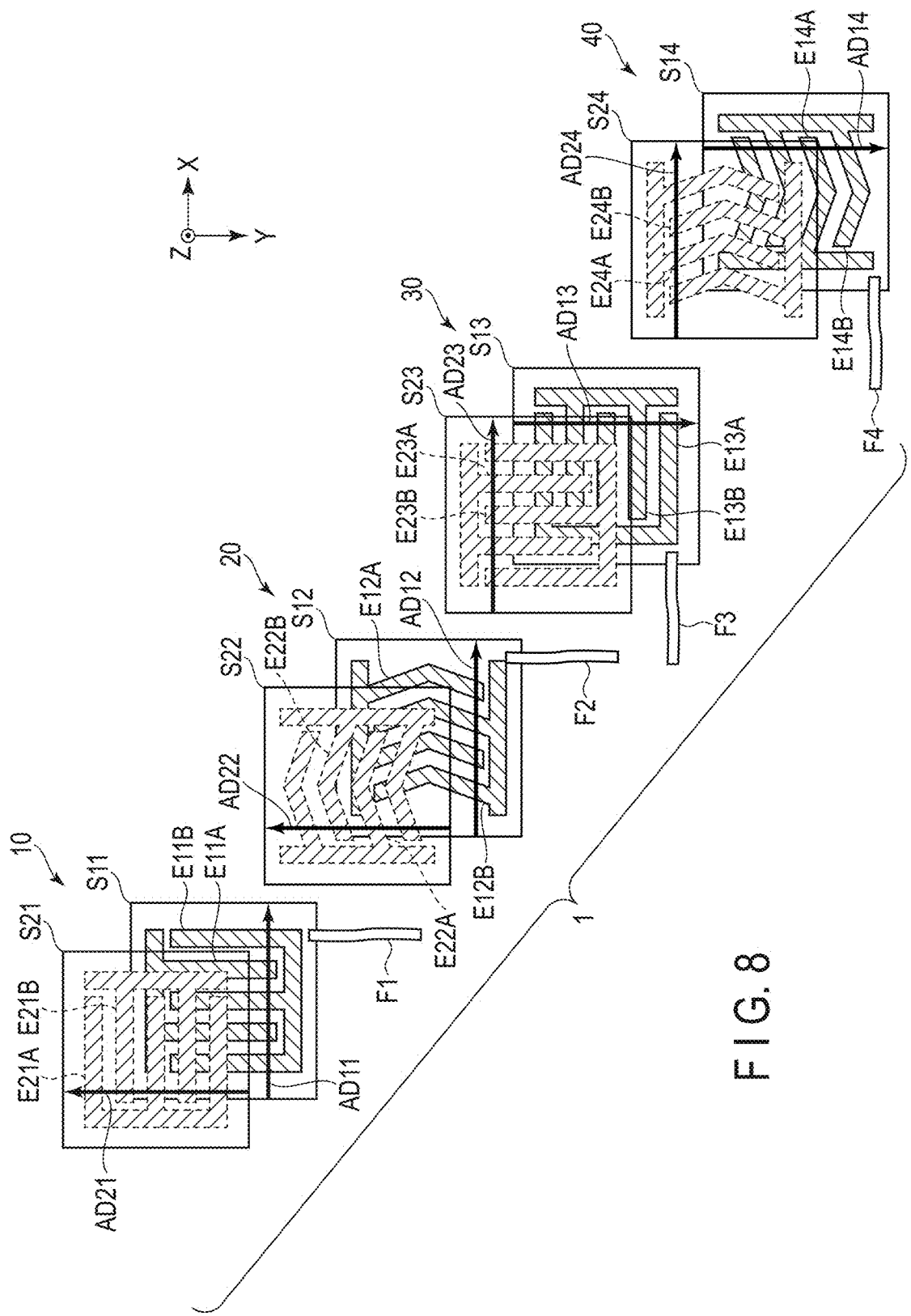
FIG. 8 is a plan view showing another example of each strip electrode which constitutes the liquid crystal device.

FIG. 8 is a plan view showing another example of each strip electrode which constitutes the liquid crystal device 1.

The configuration example shown in FIG. 8 is different from that shown in FIG. 4 in that zigzag-shaped electrodes are provided.

In FIG. 8, the first liquid crystal cell 10 and the third liquid crystal cell 30 are the same as those shown in FIG. 4. The second liquid crystal cell 20 and the fourth liquid crystal cell 40 shown in FIG. 8 comprise strip electrodes having a zigzag shape in place of a wavy shape.

Figure 9A:
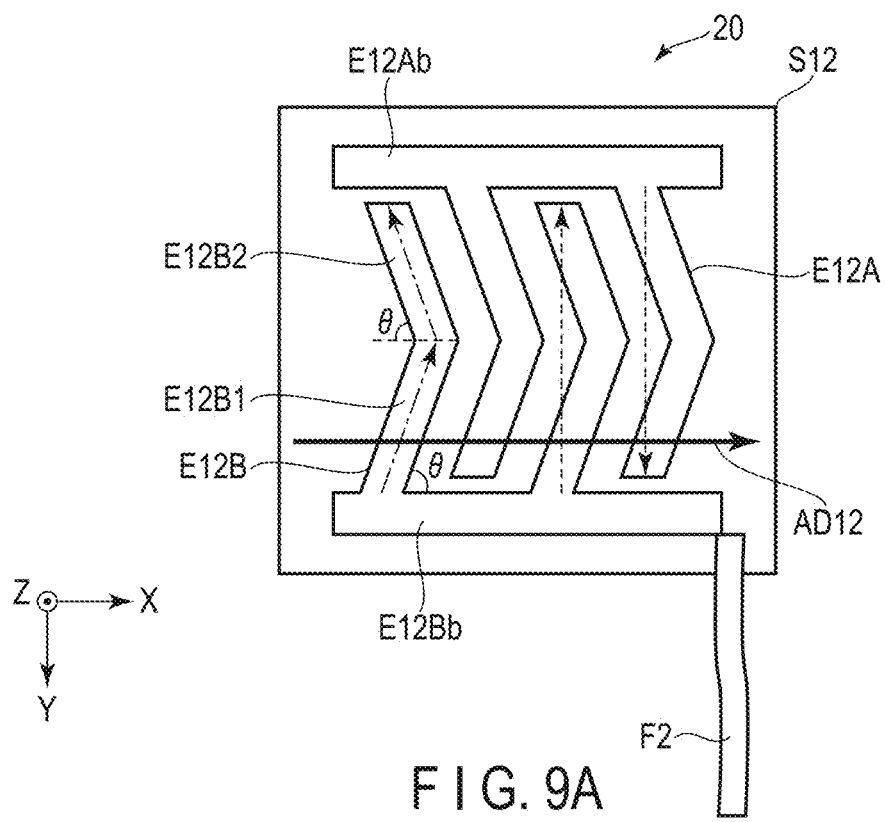
FIG. 9A is a plan view of a second liquid crystal cell.
Figure 9B:
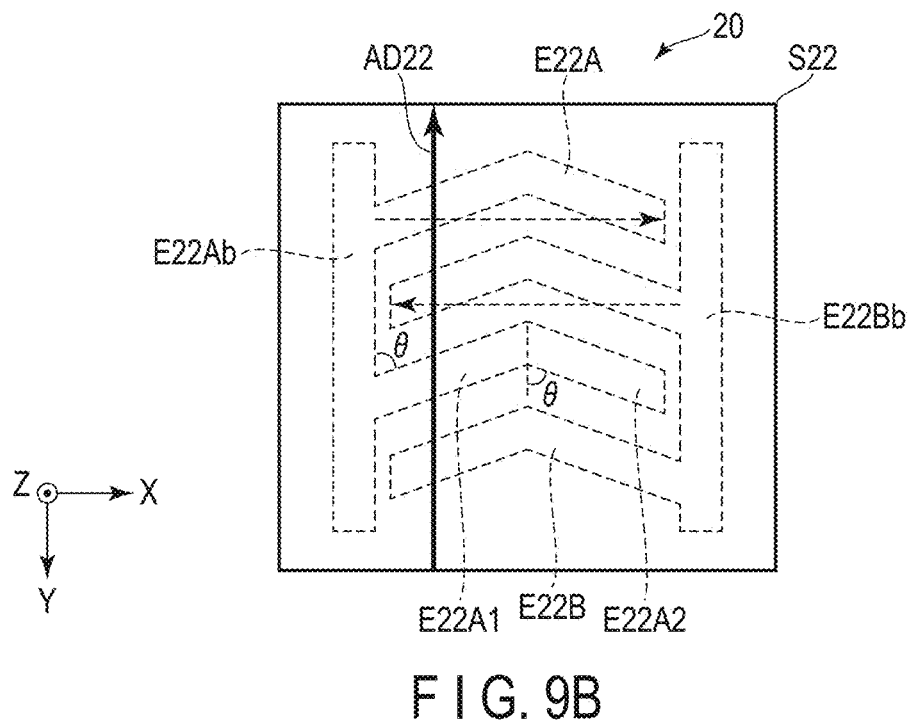
FIG. 9B is a plan view of the second liquid crystal cell.

FIGS. 9A and 9B are plan views of the second liquid crystal cell 20. The first strip electrode E12A and the second strip electrode E12B are electrodes having a zigzag shape. For example, the second strip electrode E12B includes a first electrode piece E12B1 and a second electrode piece E12B2, which continuously form a zigzag shape. As shown in FIG. 9A, for example, the first electrode piece E12B1 extends from a rectangular electrode E12Bb extending in a direction parallel to the first direction X, in a direction which makes an acute angle θ counterclockwise with the first direction X, as shown by a single dashed arrow. The second electrode piece E12B2 extends from the first electrode piece E12B1 in a direction which makes an acute angle θ clockwise with the first direction X, as indicated by a single dashed arrow. In FIG. 9, the second strip electrode E12B is formed by a pair of first and second electrode pieces E12B1 and E12B2, exhibiting a V-shaped configuration. As an alternative, the second strip electrode E12B may as well be configured to include a plurality of first electrode pieces E12B1 and second electrode pieces E12B1 arranged alternately along the second direction Y. The term "zigzag shape" described above means a shape in which a pair of a first electrode piece E12B1 and a second electrode piece E12B2 are formed, or a plurality of first electrode pieces E12B1 and second electrode pieces E12B2 are repeatedly formed. The acute angle θ is between 85° or more but 89° or less. The extending directions of the first electrode pieces E12B1 and the second electrode pieces E12B2 may as well be opposite to each other.

When the combination of the first electrode piece E12B1 and the second electrode piece E12B2 is repeatedly formed in a plurality of sets along the first direction X, the second strip electrode E12B as a whole extends along a direction parallel to the second direction Y, as shown by the dotted arrow.

The first strip electrode E12A as a whole, as in the case of the second strip electrode E12B as a whole, extends along the second direction Y, as indicated by the dotted arrow. The configuration of each first strip electrode E12A is the same as that of the second strip electrode E12B.

The third strip electrode E22A and the fourth strip electrode E22B of the second transparent substrate S22 extend along a direction parallel to the first direction X. For example, the third strip electrode E22A includes a first electrode piece E22A1 and a second electrode piece E22A2, which continuously form a zigzag shape. The first electrode piece and the second electrode piece of the third strip electrode E22A continuously form a zigzag shape.

As shown in FIG. 9B, for example, the first electrode piece E22A1 extends from the rectangular electrode E22Ab extending in a direction parallel to the second direction Y, in a direction which makes an acute angle θ clockwise with the second direction Y, as indicated by a single dashed arrow. The second electrode piece E22A2 extends from the first electrode piece E22A1 in a direction which makes an acute angle θ counterclockwise with the second direction Y, as indicated by a single dashed arrow. The first electrode piece E22A1 and the second electrode piece E22A2 are formed repeatedly to constitute the third strip electrode E22A. The extending directions of the first electrode piece E22A1 and the second electrode piece E22A2 may as well be opposite to each other.

The combination of the first electrode piece E22A1 and the second electrode piece E22A2 is repeatedly formed in a plurality of times along the first direction X, and thus the third strip electrode E22A as a whole extends along a direction parallel to the first direction Y, as shown by the dotted arrow.

The fourth strip electrode E22B, as in the case of the third strip electrode E22A, extends from the rectangular electrode E22Bb along a direction parallel to the first direction X as a whole. The configuration of each fourth strip electrode E22B is similar to that of the third strip electrode E22A.

The direction in which the first strip electrode E14A and the second strip electrode E14B of the fourth liquid crystal cell 40 extend is similar to the direction in which the third strip electrode E22A and the fourth strip electrode E22B of the second liquid crystal cell 20 extend. The direction in which the third strip electrode E24A and the fourth strip electrode E24B extend is similar to the direction in which the first strip electrode E12A and the second strip electrode E12B extend.

In this example, the extending directions of the strip electrodes of each of the first liquid crystal cell 10, second liquid crystal cell 20, third liquid crystal cell 30, and fourth liquid crystal cell 40, and the alignment treatment direction of the alignment films are similar to those described in Example 1. Therefore, for these configurations, the above-provided explanation should be referred to, and the explanation thereof will be omitted here.

In this example, for example, in the first liquid crystal cell 10 and the second liquid crystal cell 20, the shape of the first strip electrode E11A and the second strip electrode E11B, which are linear, and the shape of the first strip electrode E12A and the second strip electrode E12B, which are in a zigzag manner overlap each other. Here, because the electrodes have different shapes, the edges of these electrodes do not match. Thus, there are no electrodes that completely overlap each other, and therefore moire can be suppressed.

The mutual relationship between the first liquid crystal cell 10 and the second liquid crystal cell 20 is provided above, and the above-provided explanation can as well be applied to the mutual relationship between the third liquid crystal cell 30 and the fourth liquid crystal cell 40.

Let us now focus on the first liquid crystal cell 10 and the fourth liquid crystal cell 40. The shape of the third strip electrode E21A and the fourth strip electrode E21B on the second transparent substrate S21 of the first liquid crystal cell 10 and the shape of the first strip electrode E14A and the second strip electrode E14B on the first transparent substrate S14 of the fourth liquid crystal cell 40 are different from each other as a linear shape and a zigzag shape (V-shape), but they all extend in the first direction X. The shape of the first strip electrode E11A and the second strip electrode E11B on the transparent substrate S11 of the first liquid crystal cell 10 and the shape of the third strip electrode E24A and the fourth strip electrode E24B on the second transparent substrate S24 of the fourth liquid crystal cell 40 are different from each other as a linear shape and a zigzag shape (V-shape), respectively, but they all extend in the second direction Y.

When the first liquid crystal cell 10 and the fourth liquid crystal cell 40 are stacked one on another, for example, the extending directions of the third strip electrode E21A and the first strip electrode E14A are the same as each other (in the first direction X), but the shapes of the electrodes are different from each other as a linear shape and a zigzag shape, and therefore the edges of the electrodes do not match. Thus, there are no electrodes that completely overlap each other, and therefore moire can be suppressed. Further, note that both the electrodes act on the same polarization component (for example, p-polarization component). Here, with the electrodes having different shapes as described above, the manner of diffusion can be changed slightly, thus also making it possible to suppress moire. Note that the other electrodes, namely, a pair of the fourth strip electrode E21B and the second strip electrode E14B, a pair of the first strip electrode E11A and the third strip electrode E24A, and a pair of the second strip electrode E11B and the fourth strip electrode E24B as well have the same extending direction, but their electrode shapes are different from each other, and therefore the edges of the electrodes do not match in plan view.

Similarly, let us focus on the second liquid crystal cell 20 and the third liquid crystal cell 30. The shape of the third strip electrode E22A and the fourth strip electrode E22B on the second transparent substrate S22 of the second liquid crystal cell 20 and the shape of the first strip electrode E13A and the second strip electrode E13B on the first transparent substrate S13 of the third liquid crystal cell 30 are different from each other as a zigzag shape (V-shape) and a straight shape, respectively, but they all extend in the first direction X. Further, the shape of the first strip electrode E12A and the second strip electrode E12B on the first transparent substrate S12 of the second liquid crystal cell 20 and the shape of the third strip electrode E23A and the fourth strip electrode E23B on the second transparent substrate S23 of the third liquid crystal cell 30 are different from each other as a zigzag shape and a linear shape, respectively, but they all extend in the second direction Y.

When the second liquid crystal cell 20 and the third liquid crystal cell 30 are stacked one on another, for example, the extending directions of the third strip electrode E22A and the first strip electrode E13A are the same as each other (in the first direction X), but the shapes of the electrodes are different from each other as a linear shape and a zigzag shape, and therefore the edges of the electrodes do not match. Thus, there are no electrodes that completely overlap each other, and therefore moire can be suppressed. Further, note that both the electrodes act on the same polarization component (for example, p-polarization component). Here, with the electrodes having different shapes as described above, the manner of diffusion can be changed slightly, thus also making it possible to suppress moire. Note that the other electrodes, namely, a pair of the fourth strip electrode E22B and the second strip electrode E13B, a pair of the first strip electrode E12A and the third strip electrode E23A, and a pair of the second strip electrode E12B and the fourth strip electrode E23B as well have the same extending direction, but their electrode shapes are different from each other, and therefore the edges of the electrodes do not match in plan view.

In addition, even when the first liquid crystal cell 10, the second liquid crystal cell 20, the third liquid crystal cell 30 and the fourth liquid crystal cell 40 are adhered to each other, there are no electrodes that completely overlap each other when viewed between the first transparent substrates of each liquid crystal cell or between the second transparent substrates, and therefore moire can be suppressed.

In this example as well, the first liquid crystal cell 10 that is rotated by 90° can as well be used as the third liquid crystal cell 30. Further, the second liquid crystal cell 20 rotated by 90° can be used as the fourth liquid crystal cell 40.

Therefore, as compared to the case where the first liquid crystal cell 10 and the third liquid crystal cell 30 are prepared separately, the cost can be reduced.

In this example as well, advantageous effects similar to those described above can be exhibited.

Example 3

Figure 10:
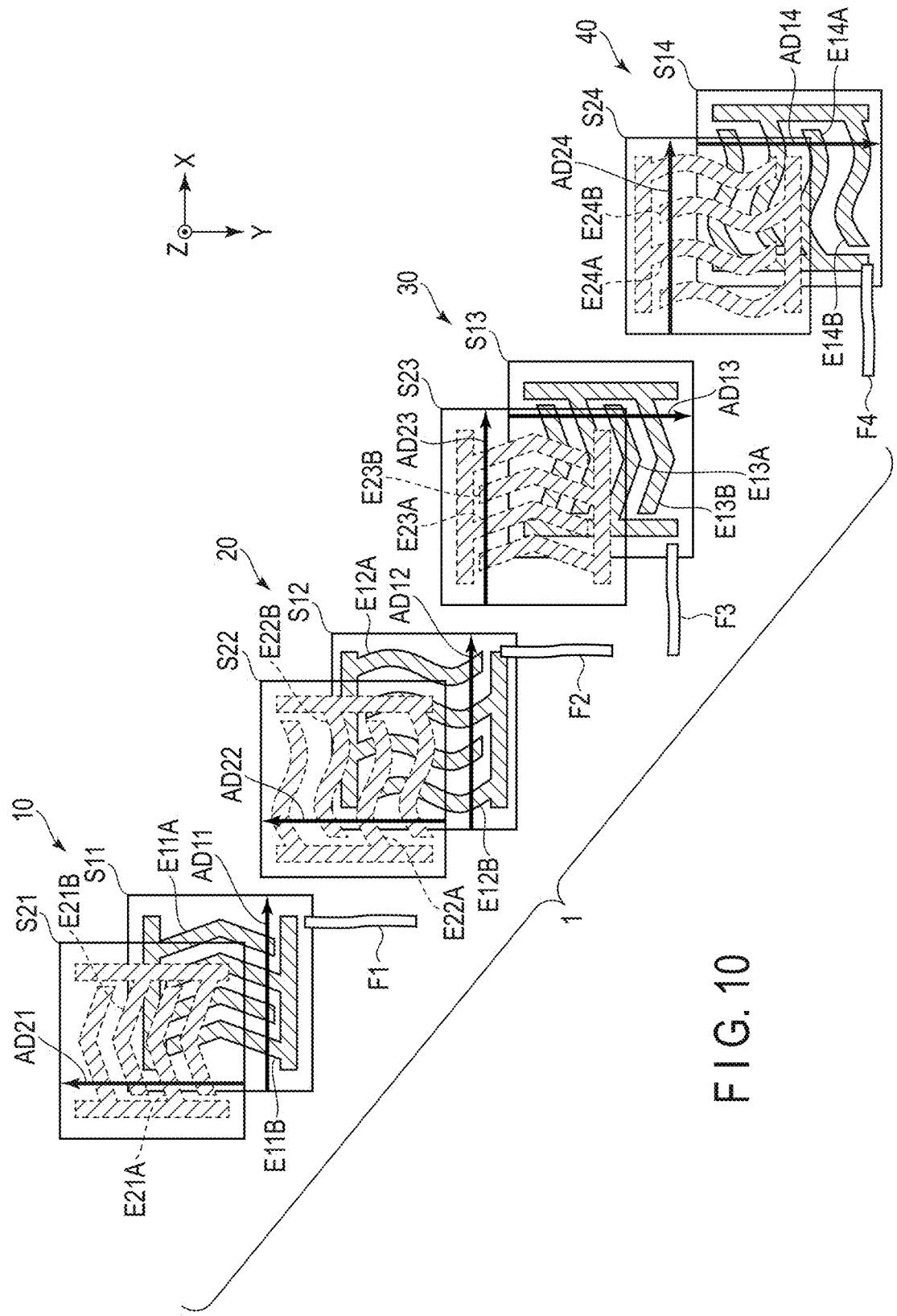
FIG. 10 is a plan view showing still another example of each strip electrode which constitutes the liquid crystal device of this example.

FIG. 10 is a plan view of another example of the strip electrodes which constitute the liquid crystal device 1 in this example. The configuration example shown in FIG. 10 is different from that of FIG. 4 in that electrodes having a zigzag shape and a wavy shape are arranged to overlap each other.

The first liquid crystal cell 10 shown in FIG. 10 is similar to the second liquid crystal cell 20 shown in FIG. 8. The third liquid crystal cell 30 shown in FIG. 10 is the first liquid crystal cell 10 shown in FIG. 10, which is rotated by 90° clockwise. The second liquid crystal cell 20 and the fourth liquid crystal cell 40 shown in FIG. 10 are similar to the second liquid crystal cell 20 and the fourth liquid crystal cell 40 shown in FIG. 4, respectively.

In this example as well, there are no electrodes that completely overlap each other when viewed between the first transparent substrates of each liquid crystal cell or between the second transparent substrates, and therefore moire can also be suppressed. By rotating the liquid crystal cell to be used as another liquid crystal cell, the cost can be reduced as compared to the case where they are prepared separately.

In this example as well, advantageous effects similar to those described above can be exhibited.

Example 4-1

Figure 11:
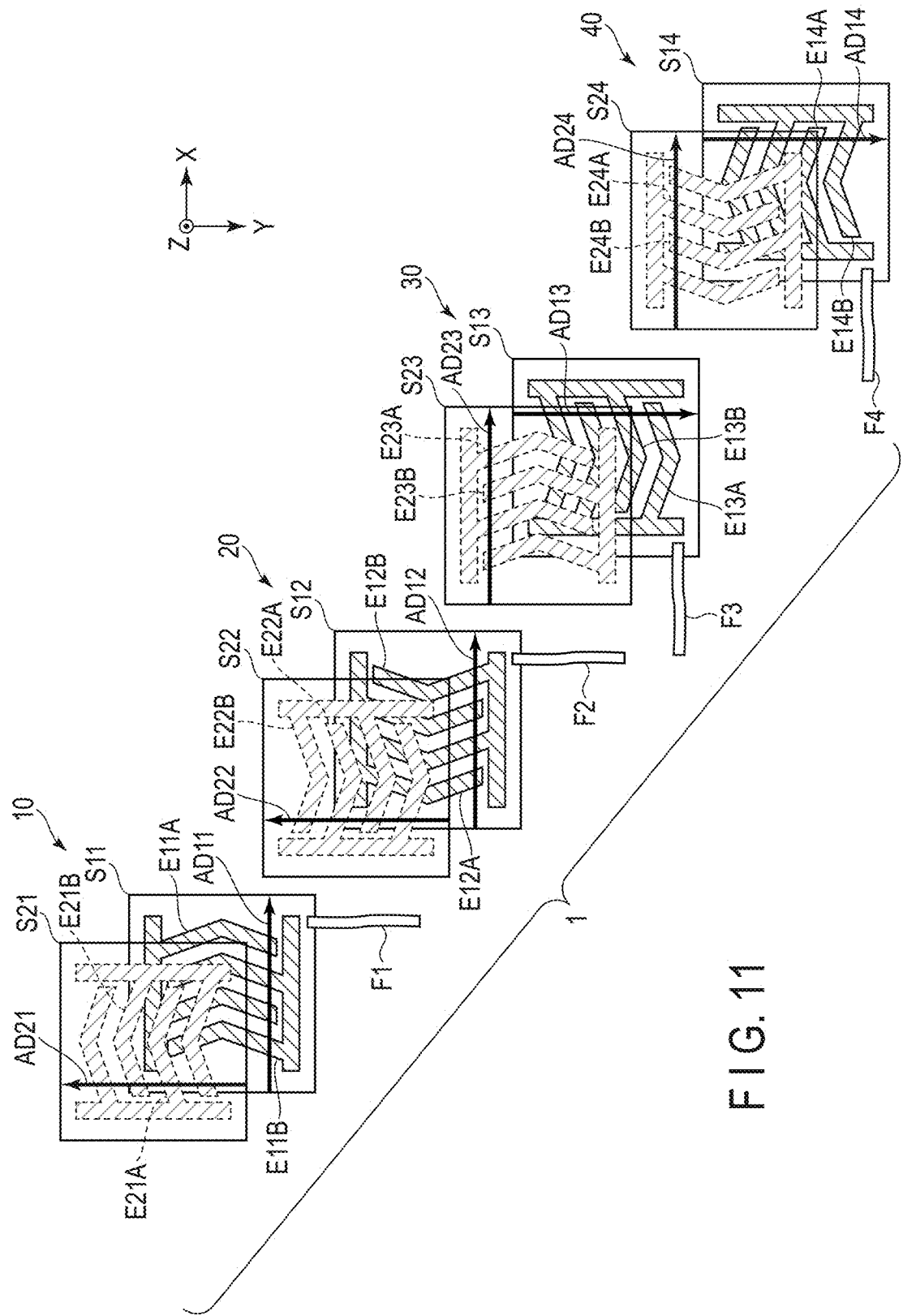
FIG. 11 is a plan view of still another example of each strip electrode which constitutes the liquid crystal device in this example.

FIG. 11 is a plan view of another example of the strip electrodes which constitute the liquid crystal device 1 in this example. The configuration example shown in FIG. 11 is different from that of FIG. 8 in that all strip electrodes have a zigzag shape.

In the liquid crystal device 1 shown in FIG. 11, the first liquid crystal cell 10 is the same as the second liquid crystal cell 20 shown in FIG. 8. In the first liquid crystal cell 10 of FIG. 11, the alignment treatment direction AD11 is in a direction of 0° with respect to the first direction X. The first strip electrode E11A and the second strip electrode E11B, which have a zigzag-shape, extend in a direction parallel to the second direction Y.

The alignment treatment direction AD21 is in a direction of 90° with respect to the first direction X. The first strip electrode E11A and the second strip electrode E11B having a zigzag shape extend in a direction parallel to the second direction Y. The third strip electrode E21A and the fourth strip electrode E21B, which have a zigzag shape, extend in a direction parallel to the first direction X.

The extending direction of the first strip electrode E11A and the second strip electrode E11B is orthogonal to the extending direction of the third strip electrode E21A and the fourth strip electrode E21B.

In the second liquid crystal cell 20, the alignment treatment direction AD12 is in a direction of 0°. The first strip electrode E12A and the second strip electrode E12B, which have a zigzag shape, extend along the second direction Y.

The alignment treatment direction AD22 is in a direction of 90°. The third strip electrode E22A and the fourth strip electrode E22B, which have a zigzag shape, extend along the first direction X.

The extending direction of the first strip electrode E12A and the second strip electrode E12B is orthogonal to the extending direction of the third strip electrode E22A and the fourth strip electrode E22B.

In the third liquid crystal cell 30, the alignment treatment direction AD13 is in a direction of −90°. The first strip electrode E13A and the second strip electrode E13B, which have a zigzag shape, extend in a direction parallel to the first direction X.

The alignment treatment direction AD23 is in a direction of 0°. The third strip electrode E23A and the fourth strip electrode E23B, which have a zigzag shape, extend along the second direction Y.

The extending direction of the first strip electrode E13A and the second strip electrode E13B is orthogonal to the extending direction of the third strip electrode E23A and the fourth strip electrode E23B.

In the fourth liquid crystal cell 40, the alignment treatment direction AD14 is in a direction of −90°. The first strip electrode E14A and the second strip electrode E14B, which have a zigzag shape, extend in a direction parallel to the first direction X.

The alignment treatment direction AD24 is in a direction of 0°. The third strip electrode E24A and the fourth strip electrode E24B, which have a zigzag shape, extend along a direction parallel to the second direction Y.

The extending direction of the first strip electrode E14A and the second strip electrode E14B is orthogonal to the extending direction of the third strip electrode E24A and the fourth strip electrode E24B.

The flexible wiring board F1 connected to the first transparent substrate S11 is drawn out approximately along the second direction Y. The flexible wiring board F2 connected to the first transparent substrate S12 is drawn out approximately along the second direction Y.

The flexible wiring board F3 connected to the first transparent substrate S13 is drawn out approximately parallel to the first direction X. The flexible wiring board F4 connected to the first transparent substrate S14 is drawn out approximately parallel to the first direction X.

In this example, the first transparent substrate S11 of the first liquid crystal cell 10 and the first transparent substrate S12 of the second liquid crystal cell 20 have respective electrodes formed on the substrates in a line symmetrical (inverted with respect to each other) relationship with respect to the second direction Y. In other words, the directions of protrusions of these electrodes in the first direction X are opposite to each other between these substrates. More specifically, the electrode of the first transparent substrate S11 of the first liquid crystal cell 10 protrudes in the positive direction of the first direction X, and the electrode of the first transparent substrate S12 of the second liquid crystal cell 20 protrudes in the negative direction of the first direction X. The second transparent substrate S21 of the first liquid crystal cell 10 and the second transparent substrate S22 of the second liquid crystal cell 20 have respective electrodes formed on the substrates in a line symmetrical (inverted with respect to each other) relationship with respect to the first direction X. More specifically, the electrodes of the second transparent substrate S21 of the first liquid crystal cell 10 protrude in the negative direction of the second direction Y, and the electrodes of the second transparent substrate S22 of the second liquid crystal cell 20 protrude in the positive direction of the second direction Y.

The first transparent substrate S13 of the third liquid crystal cell 30 and the first transparent substrate S14 of the fourth liquid crystal cell 40 have respective electrodes formed on the substrates in a line symmetrical (inverted with respect to each other) relationship with respect to the first direction X. The second transparent substrate S23 of the third liquid crystal cell 30 and the second transparent substrate S24 of the fourth liquid crystal cell 40 have respective electrodes formed on the substrates in a line symmetrical (inverted with respect to each other) relationship with respect to the second direction Y.

In this example as well, there are no electrodes that completely overlap each other when viewed between the first transparent substrates of each liquid crystal cell or between the second transparent substrates, and therefore moire can also be suppressed. By rearranging the transparent substrate to be used as another transparent substrate, the cost can be reduced as compared to the case where they are prepared separately.

In this example as well, advantageous effects similar to those described above can be exhibited.

Example 4-2

Figure 12:
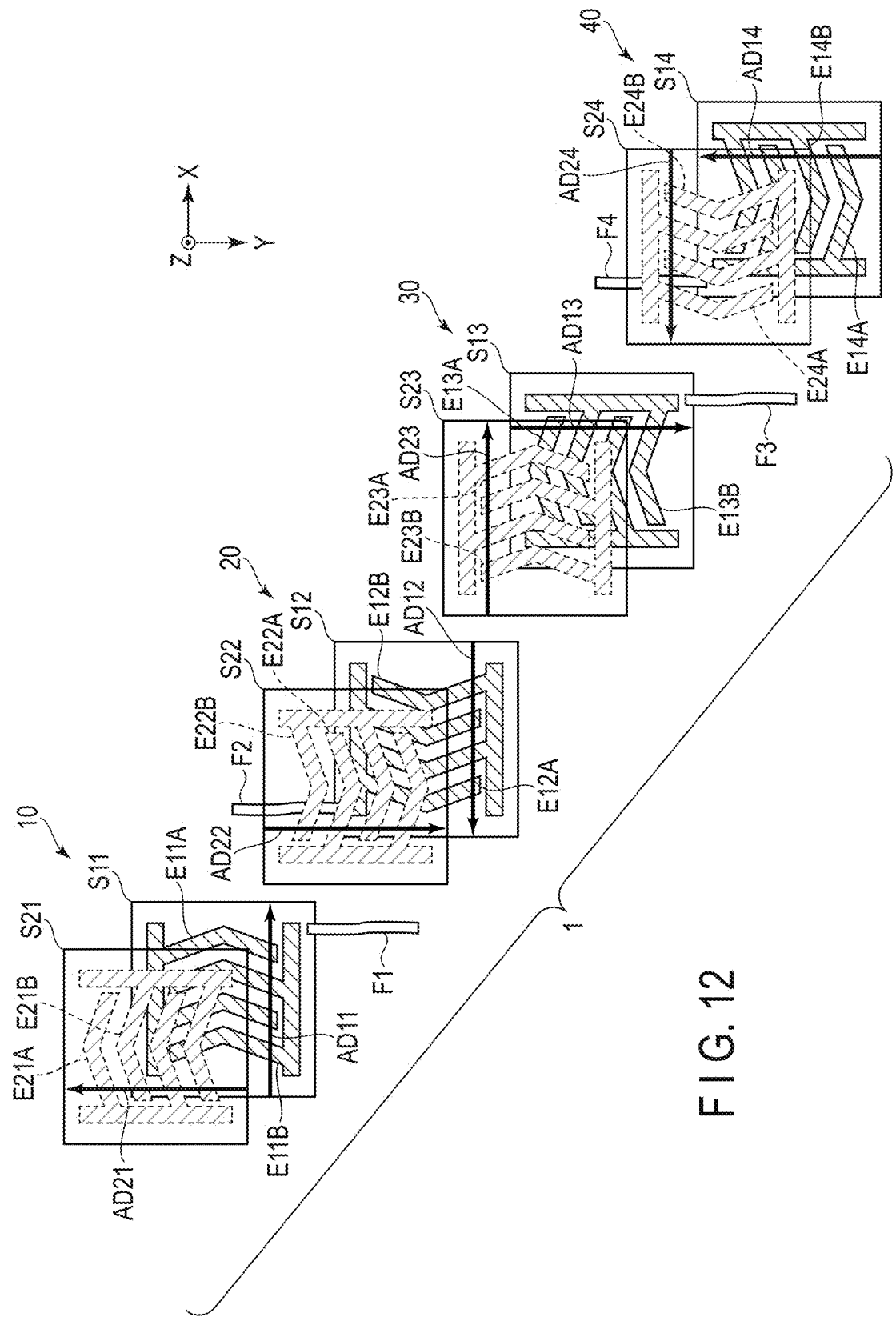
FIG. 12 is a plan view of still another example of each strip electrode which constitutes the liquid crystal device in this example.

FIG. 12 is a plan view of another example of the strip electrodes that constitute the liquid crystal device 1 in this example. The configuration example shown in FIG. 12 is different from that of FIG. 11 in that a liquid crystal cell is rotated to be used as another liquid crystal cell.

In this example, the second liquid crystal cell 20 is one that is obtained by rotating the first liquid crystal cell 10 by 180°. Further, the fourth liquid crystal cell 40 is one that is obtained by rotating the third liquid crystal cell 30 by 180°. By rotating the liquid crystal cells to be used as other liquid crystal cells, the cost can be reduced as compared to the case where they are prepared separately.

In this example as well, there are no electrodes that completely overlap each other when viewed between the first transparent substrates of each liquid crystal cell or between the second transparent substrates, and therefore moire can also be suppressed.

In this example, advantageous effects similar to those described above can be exhibited.

Example 4-3

Figure 13:
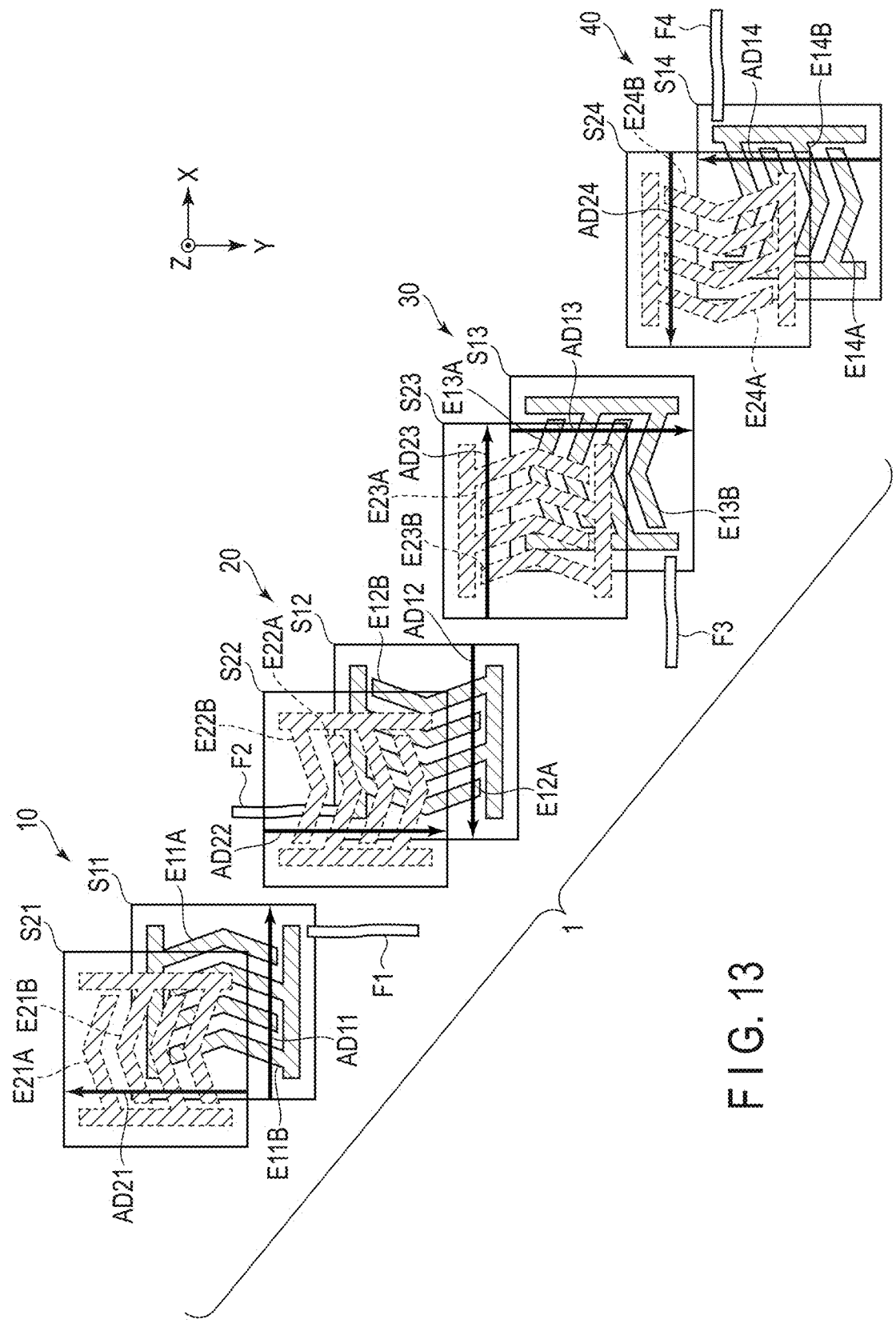
FIG. 13 is a plan view of still another example of each strip electrode which constitutes the liquid crystal device in this example.

FIG. 13 is a plan view of another example of the strip electrodes that constitute the liquid crystal device 1 in this example. The configuration example shown in FIG. 13 is different from that of FIG. 11 in that the transparent substrates are rotated.

The first liquid crystal cell 10 shown in FIG. 13 is similar to the first liquid crystal cell 10 shown in FIG. 11.

The first transparent substrate S12 of the second liquid crystal cell 20 is the one obtained by rotating the first transparent substrate S11 of the first liquid crystal cell 10 by 180°. The second transparent substrate S22 of the second liquid crystal cell 20 is the one obtained by rotating the second transparent substrate S21 of the first liquid crystal cell 10 by 180°.

The third liquid crystal cell 30 is the one obtained by rotating the first liquid crystal cell 10 by 90° clockwise.

The fourth liquid crystal cell 40 is the one obtained by rotating the second liquid crystal cell 20 by 90° clockwise.

In this example as well, by changing the transparent substrate to be used as another transparent substrate, the cost can be reduced as compared to the case where they are prepared separately.

In this example as well, there are no electrodes that completely overlap each other when viewed between the first transparent substrates of each liquid crystal cell or between the second transparent substrates, and therefore moire can also be suppressed.

In this example, advantageous effects similar to those described above can be exhibited.

Example 4-4

Figure 14:
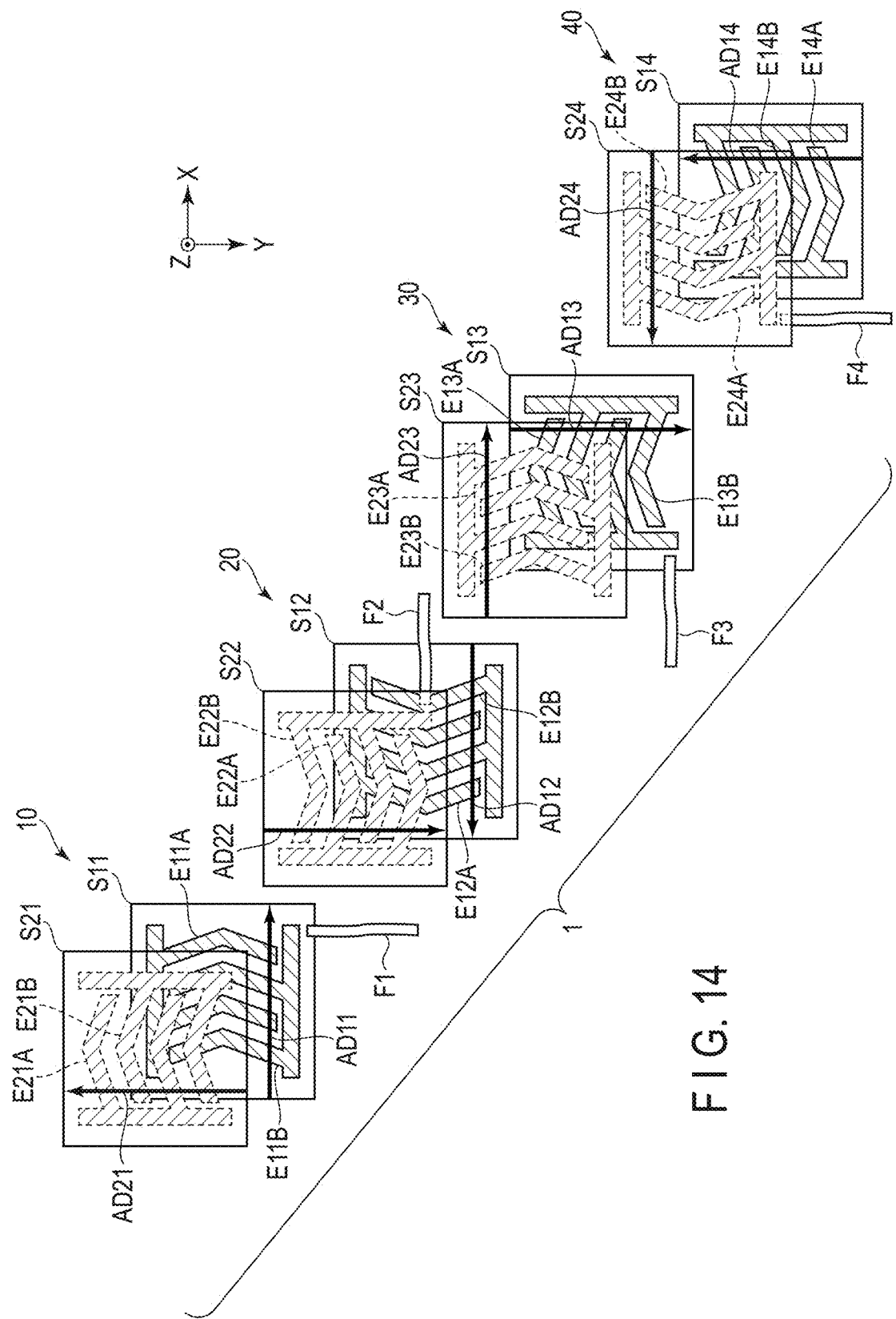
FIG. 14 is a plan view of still another example of each strip electrode which constitutes the liquid crystal device of this example.

FIG. 14 is a plan view of another example of the strip electrodes that constitute the liquid crystal device 1 in this example. The configuration example shown in FIG. 14 is different from that of FIG. 11 in that a rotated transparent substrate is used for another substrate.

In the liquid crystal device 1 shown in FIG. 14, the first liquid crystal cell 10 is the same as the first liquid crystal cell 10 shown in FIG. 11.

The second liquid crystal cell 20 is the one obtained by switching front and rear sides of the first liquid crystal cell 10 and further rotating it by 90° counterclockwise. That is, the second transparent substrate S22 of the second liquid crystal cell 20 is the same as the first transparent substrate S11 of the first liquid crystal cell 10. The first transparent substrate S12 of the second liquid crystal cell 20 is the same as the second transparent substrate S21 of the first liquid crystal cell 10.

The third liquid crystal cell 30 is the one obtained by rotating the first liquid crystal cell 10 by 90° clockwise. The fourth liquid crystal cell 40 is the one obtained by rotating the second liquid crystal cell 20 by 90° clockwise.

By changing the arrangement of the liquid crystal cells to be used as other liquid crystal cells, the cost can be reduced as compared to the case where they are prepared separately.

In this example as well, there are no electrodes that completely overlap each other when viewed between the first transparent substrates of each liquid crystal cell or between the second transparent substrates, and therefore moire can also be suppressed.

In this example, advantageous effects similar to those described above can be exhibited.

Example 5

Figure 15:
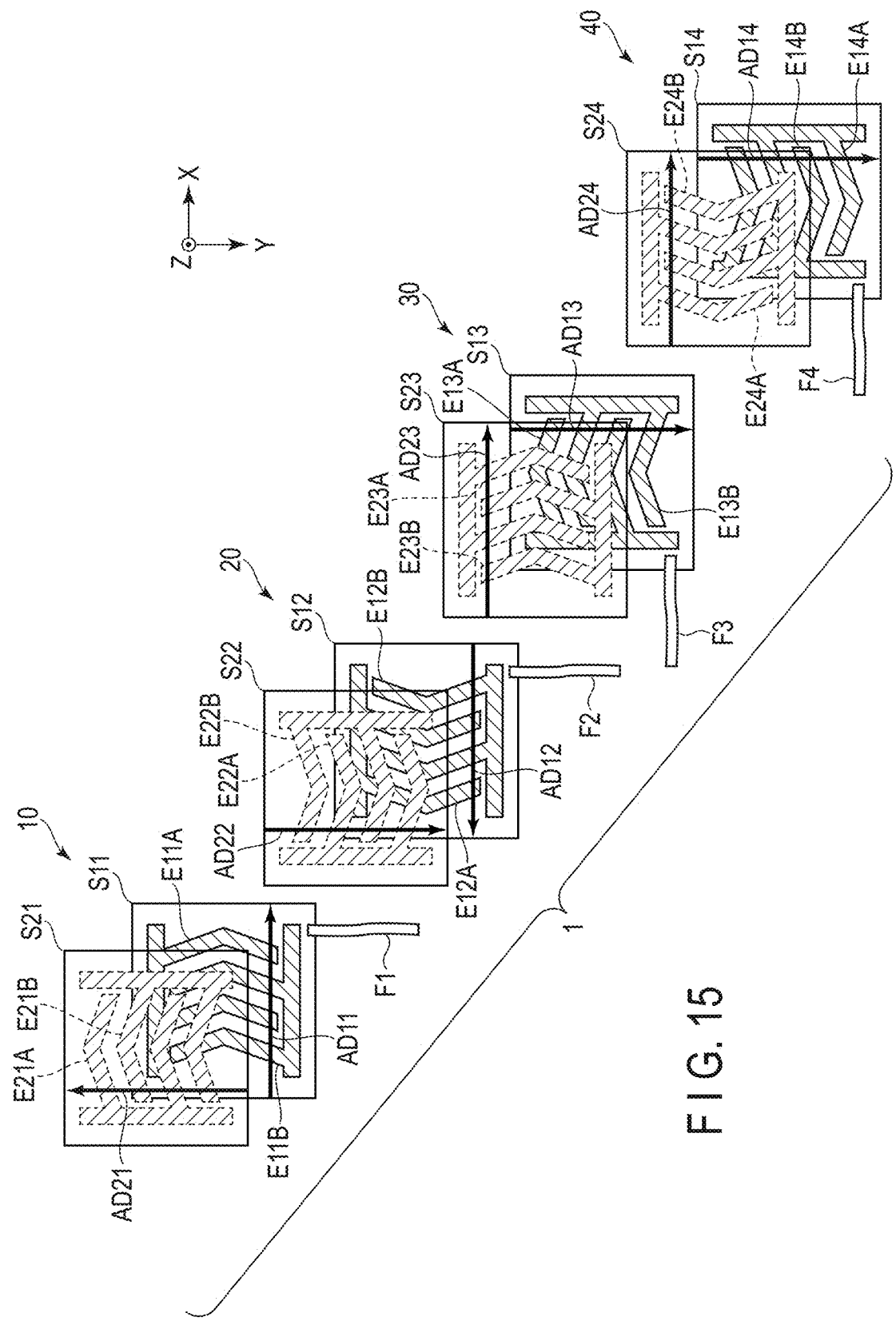
FIG. 15 is a plan view of still another example of each strip electrode which constitutes the liquid crystal device in this example.

FIG. 15 is a plan view of another example of the strip electrodes that constitute the liquid crystal device 1 in this example. The configuration example shown in FIG. 15 is different from that of FIG. 11 in that the second transparent substrate is rotated by 180° in the third liquid crystal cells 30 and the fourth liquid crystal cell 40 with reference to that of the first liquid crystal cell 10.

In the liquid crystal device 1 shown in FIG. 15, the first liquid crystal cell 10 is the same as the first liquid crystal cell 10 shown in FIG. 11.

The second liquid crystal cell 20 is the one obtained by rotating the first liquid crystal cell 10 by 180°.

The third liquid crystal cell 30 is the one obtained by rotating the second transparent substrate of the first liquid crystal cell 10 by 180° and then attaching it to the first transparent substrate, followed by rotation by 90° counterclockwise.

The fourth liquid crystal cell 40 is the one obtained by rotating the third liquid crystal cell 30 by 180°.

By changing the arrangement of transparent substrates to be used other transparent substrates, the cost can be reduced as compared to the case where they are prepared separately.

In this example as well, there are no electrodes that completely overlap each other when viewed between the first transparent substrates of each liquid crystal cell or between the second transparent substrates, and therefore moire can also be suppressed.

In this example, advantageous effects similar to those described above can be exhibited.

Example 6-1

Figure 16:
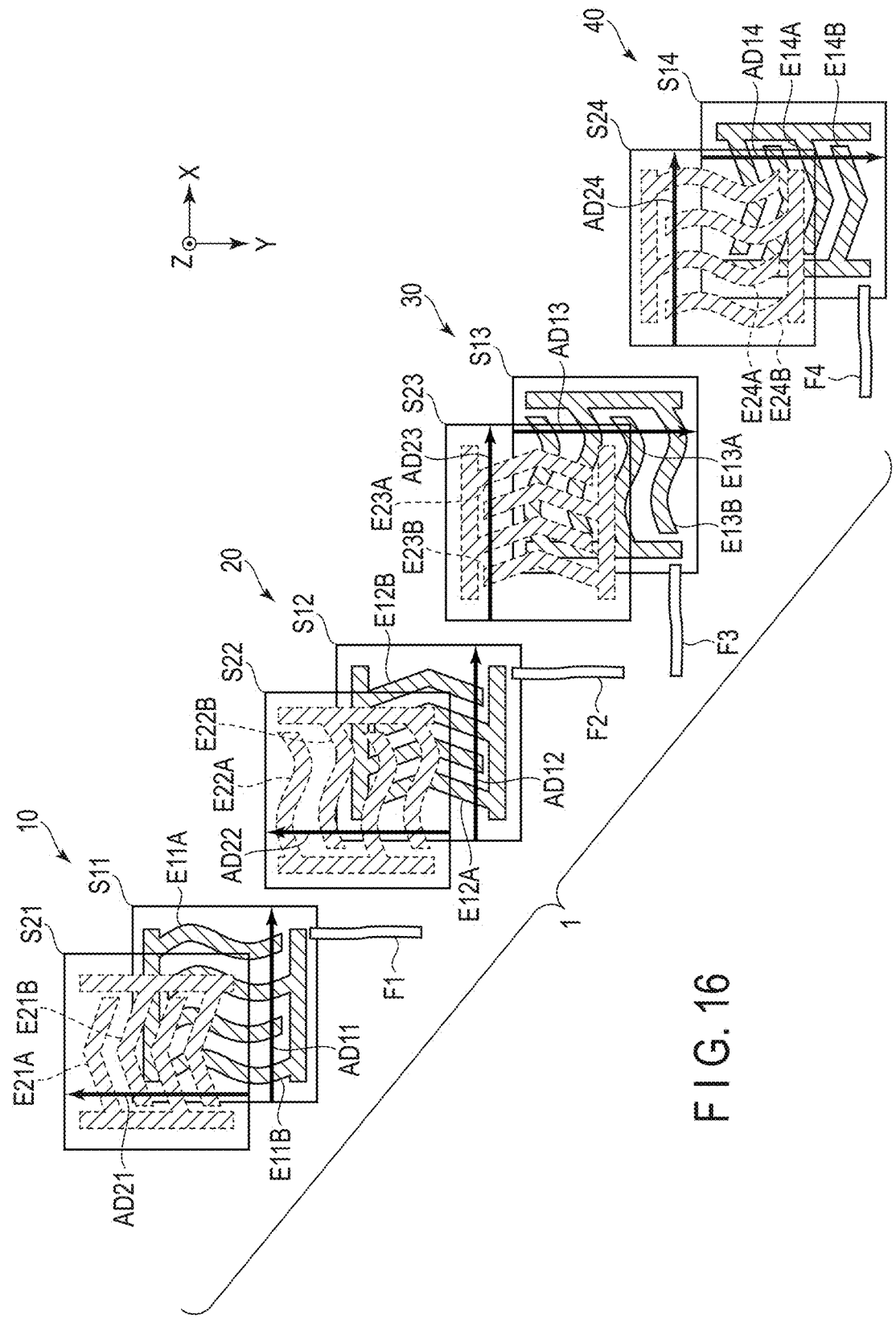
FIG. 16 is a plan view of still another example of each strip electrode which constitutes the liquid crystal device in this example.

FIG. 16 is a plan view of another example of the strip electrodes that constitute the liquid crystal device 1 in this example. The configuration example shown in FIG. 16 is different from that of FIG. 11 in that one liquid crystal cell comprises a wavy shaped electrode and a zigzag-shaped electrode.

In the liquid crystal device 1 shown in FIG. 16, in the first liquid crystal cell 10, the alignment treatment direction AD11 is in a direction of 0° with respect to the first direction X. The first strip electrode E11A and the second strip electrode E11B, which have a wavy shape, extend in a direction parallel to the second direction Y.

The alignment treatment direction AD21 is in a direction of 90° with respect to the first direction X. The first stripe electrodes E11A and the second stripe electrode E11B, which have a wavy shape, extend in a direction parallel to the second direction Y. The third strip electrode E21A and the fourth strip electrode E21B, which have a zigzag shape, extend in a direction parallel to the first direction X.

The extending direction of the first strip electrode E11A and the second strip electrode E11B is orthogonal to the extending direction of the third strip electrode E21A and the fourth strip electrode E21B.

In the second liquid crystal cell 20, the alignment treatment direction AD12 is in a direction of 0°. The first strip electrode E12A and the second strip electrode E12B, which have a zigzag shape, extend along the second direction Y.

The alignment treatment direction AD22 is in a direction of 90°. The third strip electrode E22A and the fourth strip electrode E22B, which have a wavy shape, extend along the first direction X.

The extending direction of the first strip electrode E12A and the second strip electrode E12B is orthogonal to the extending direction of the third strip electrode E22A and the fourth strip electrode E22B.

In the third liquid crystal cell 30, the alignment treatment direction AD13 is in a direction of −90°. The first strip electrode E13A and the second strip electrode E13B, which have a wavy shape, extend in a direction parallel to the first direction X.

The alignment treatment direction AD23 is in a direction of 0°. The third strip electrode E23A and the fourth strip electrode E23B, which have a zigzag shape, extend along the second direction Y.

The extending direction of the first strip electrode E13A and the second strip electrode E13B is orthogonal to the extending direction of the third strip electrode E23A and the fourth strip electrode E23B.

In the fourth liquid crystal cell 40, the alignment treatment direction AD14 is in a direction of −90°. The first strip electrode E14A and the second strip electrode E14B, which have a zigzag shape, extend in a direction parallel to the first direction X.

The alignment treatment direction AD24 is in a direction of 0°. The third strip electrode E24A and the fourth strip electrode E24B, which have a wavy shape, extend along a direction parallel to the second direction Y.

The extending direction of the first strip electrode E14A and the second strip electrode E14B is orthogonal to the extending direction of the third strip electrode E24A and the fourth strip electrode E24B.

In the liquid crystal device 1 shown in FIG. 16, the flexible wiring board F1 connected to the first transparent substrate S11 and the flexible wiring board F2 connected to the first transparent substrate S12 are drawn out approximately along the second direction Y.

The flexible wiring board F3 connected to the first transparent substrate S13 and the flexible wiring board F4 connected to the first transparent substrate S14 are drawn out approximately in a direction parallel to the first direction X.

In FIG. 16, the third liquid crystal cell 30 is the one obtained by rotating the first liquid crystal cell 10 by 90° clockwise. The fourth liquid crystal cell 40 is the one obtained by rotating the second liquid crystal cell 20 by 90° clockwise.

By changing the arrangement of transparent substrates to be used other transparent substrates, the cost can be reduced as compared to the case where they are prepared separately.

In this example, a strip electrode having a zigzag shape and a strip electrode having a wavy shape are provided in one liquid crystal cell. With this configuration, even in liquid crystal cells overlapping each other, there are no electrodes that completely overlap each other when viewed between the first transparent substrates of each liquid crystal cell or between the second transparent substrates, and therefore moire can also be suppressed.

Note that this example describes a case where a strip electrode having a zigzag shape and a strip electrode having a wavy shape are provided in one liquid crystal cell, but the present invention is not limited to this. Alternatively, for example, one liquid crystal cell may comprise a strip electrode having a linear shape and a strip electrode having a wavy shape, described above, or, a strip electrode having a linear shape and a strip electrode having a zigzag shape. Further, for example, a liquid crystal cell comprising a strip electrode having a linear shape and a strip electrode having a zigzag shape, a liquid crystal cell comprising a strip electrode having a linear shape and a strip electrode having a wavy shape, and a liquid crystal cell comprising a strip electrode having a zigzag shape and a strip electrode having a wavy shape may overlap each other. By providing liquid crystal cells comprising strip electrodes having such different shapes, moire can be further suppressed.

In this example, advantageous effects similar to those described above can be exhibited.

Example 6-2

Figure 17:
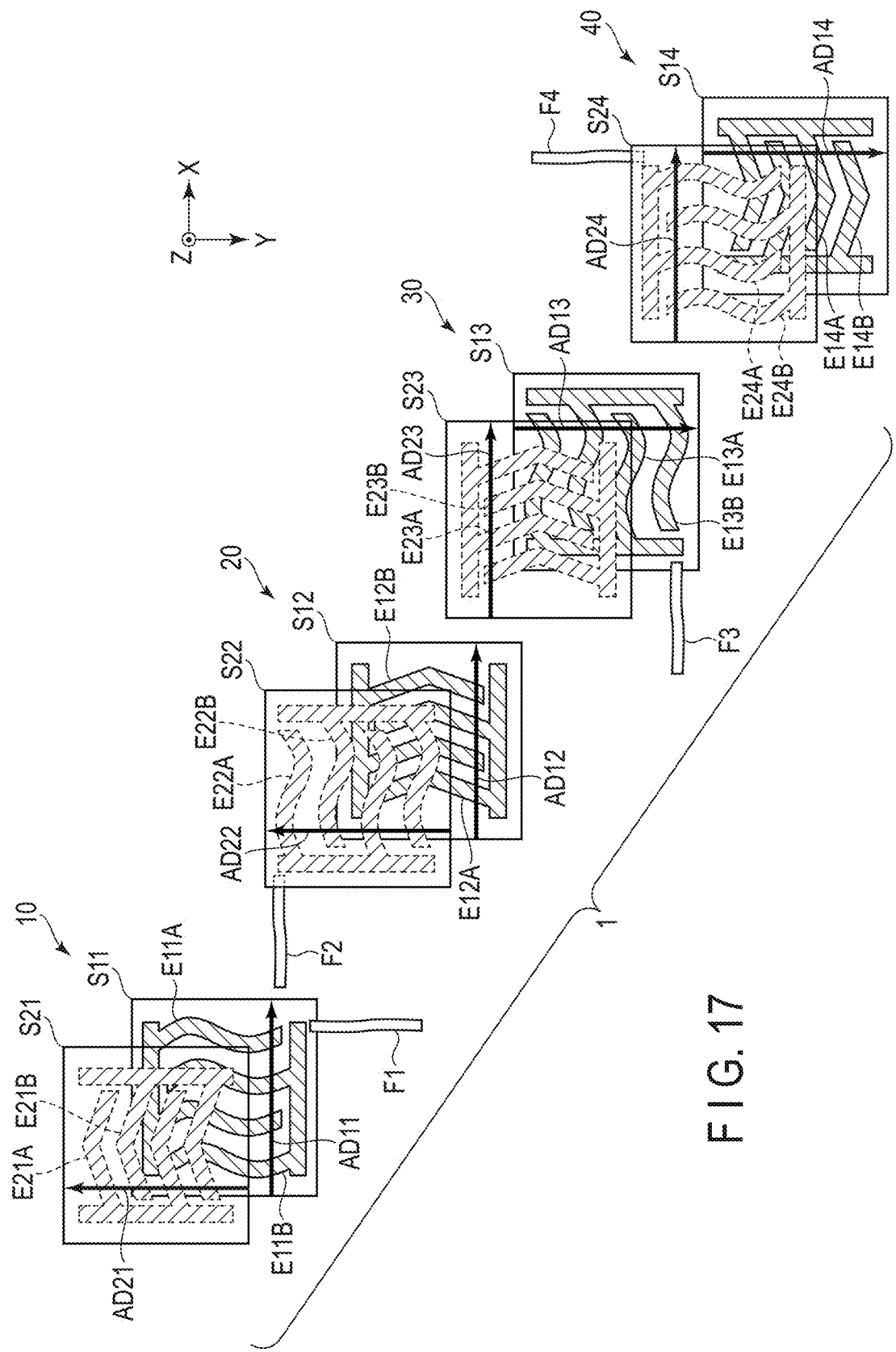
FIG. 17 is a plan view of still another example of each strip electrode which constitutes the liquid crystal device of this example.

FIG. 17 is a plan view of another example of the strip electrodes that constitutes the liquid crystal device 1 in this example. The configuration example shown in FIG. 17 is different from that of FIG. 16 in that the flexible wiring boards of the second liquid crystal cell and the fourth liquid crystal cell are provided on the second transparent substrate.

In the liquid crystal device 1 shown in FIG. 17, the first liquid crystal cell 10 is the same as the first liquid crystal cell 10 shown in FIG. 16.

The alignment treatment direction AD11 is in a direction of 0° with respect to the first direction X. The first strip electrode E11A and the second strip electrode E11B having a wavy shape extend in a direction parallel to the second direction Y. The alignment treatment direction AD21 is in a direction of 90° with respect to the first direction X. The third strip electrode E21A and the fourth strip electrode E21B, which have a zigzag shape, extend in a direction parallel to the first direction X.

The extending direction of the first strip electrode E11A and the second strip electrode E11B is orthogonal to the extending direction of the third strip electrode E21A and the fourth strip electrode E21B.

In the second liquid crystal cell 20, the alignment treatment direction AD12 is in a direction of 0°. The first strip electrode E12A and the second strip electrode E12B, which have a wavy shape, extend along the second direction Y.

The alignment treatment direction AD22 is in a direction of 90°. The third strip electrode E22A and the fourth strip electrode E22B, which have a zigzag shape, extend along the first direction X.

The extending direction of the first strip electrode E12A and the second strip electrode E12B is orthogonal to the extending direction of the third strip electrode E22A and the fourth strip electrode E22B.

The first transparent substrate S12 of the second liquid crystal cell 20 is the one obtained by rotating the second transparent substrate S21 of the first liquid crystal cell 10 by 90° clockwise and turning it upside down. The second transparent substrate S22 of the second liquid crystal cell 20 is the one obtained by rotating the first transparent substrate S11 of the first liquid crystal cell 10 by 90° counterclockwise and turning it left to right.

The third liquid crystal cell 30 is the one obtained by rotating the first liquid crystal cell 10 by 90° clockwise.

The first transparent substrate S14 of the fourth liquid crystal cell 40 is the one obtained by rotating the first transparent substrate S12 of the second liquid crystal cell 20 by 90° clockwise and turning it left to right. The second transparent substrate S24 of the fourth liquid crystal cell 40 is the one obtained by rotating the second transparent substrate S22 of the second liquid crystal cell 20 by 90° clockwise and reversing the alignment treatment direction.

In the liquid crystal device 1 shown in FIG. 17, the flexible wiring board F1 connected to the first transparent substrate S11 is drawn out approximately along the second direction Y. The flexible wiring board F2 connected to the second transparent substrate S22 is drawn out approximately along a direction opposite to the first direction X.

The flexible wiring board F3 connected to the first transparent substrate S13 is drawn out approximately along a direction opposite to the first direction X. The flexible wiring board F4 connected to the second transparent substrate S24 is drawn out approximately in a direction opposite to the second direction Y.

By changing the arrangement of the same transparent substrates to be used as other transparent substrates, the cost can be reduced as compared to the case where they are prepared separately.

In this example as well, there are no electrodes that completely overlap each other when viewed between the first transparent substrates of each liquid crystal cell or between the second transparent substrates, and therefore moire can also be suppressed.

In this example, advantageous effects similar to those described above can be exhibited.

In this disclosure, one of the linear, wavy and zigzag shapes may as well be referred to as the first shape, and another one as the second shape.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal device comprising:
 a first liquid crystal cell;
 a second liquid crystal cell which overlaps the first liquid crystal cell;
 a third liquid crystal cell which overlaps the second liquid crystal cell; and
 a fourth liquid crystal cell which overlaps the third liquid crystal cell,
 each of the first liquid crystal cell to the fourth liquid crystal cell, comprising:
 a first transparent substrate;
 a first alignment film;
 a first strip electrode and a second strip electrode, located between the first transparent substrate and the first alignment film and arranged to be spaced apart from each other, to which different voltages are applied, respectively;
 a second transparent substrate;
 a second alignment film;
 a third strip electrode and a fourth strip electrode, located between the second transparent substrate and the second alignment film and arranged to be spaced apart from each other, to which different voltages are applied, respectively; and
 a liquid crystal layer located between the first alignment film and the second alignment film, wherein
 all of the first strip electrode, the second strip electrode, the third strip electrode, and the fourth strip electrode provided in the first liquid crystal cell have the zigzag shape,
 all of the first strip electrode, the second strip electrode, the third strip electrode, and the fourth strip electrode provided in the second liquid crystal cell have the zigzag shape,
 the first strip electrode and the second strip electrode provided on the first transparent substrate of the first liquid crystal cell, and the first strip electrode and the second strip electrode provided on the first transparent substrate of the second liquid crystal cell are in a line symmetrical relationship with respect to a first direction as an axis,
 the third strip electrode and the fourth strip electrode provided on the second transparent substrate of the first liquid crystal cell and the third strip electrode and the fourth strip electrode on the second transparent substrate of the second liquid crystal cell are in a line symmetrical relationship with respect to a second direction, which intersects the first direction, as an axis,
 the first strip electrode and the second strip electrode provided on the first transparent substrate of the third liquid crystal cell and the first strip electrode and the second strip electrode provided on the first transparent substrate of the fourth liquid crystal cell are in a line symmetrical relationship with respect to the second direction as an axis, and
 the third strip electrode and the fourth strip electrode provided on the second transparent substrate of the third liquid crystal cell and the third strip electrode and the fourth strip electrode provided on the second transparent substrate of the fourth liquid crystal cell are in a line symmetrical relationship with respect the first direction as an axis.

2. The liquid crystal device according to claim 1, wherein
 the second liquid crystal cell is one obtained by rotating the first liquid crystal cell by 180°, and
 the fourth liquid crystal cell is one obtained by rotating the third liquid crystal cell by 180°.

* * * * *